(12) United States Patent
Lee et al.

(10) Patent No.: US 11,202,034 B2
(45) Date of Patent: Dec. 14, 2021

(54) ELECTRONIC DEVICE INCLUDING FLEXIBLE DISPLAY

(71) Applicant: Samsung Electronics Co., Ltd., Gyeonggi-do (KR)

(72) Inventors: Won Lee, Gyeonggi-do (KR); Younghak Oh, Gyeonggi-do (KR); Bokeun Kim, Gyeonggi-do (KR); Kyuok Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/072,159

(22) Filed: Oct. 16, 2020

(65) Prior Publication Data

US 2021/0120207 A1 Apr. 22, 2021

(30) Foreign Application Priority Data

Oct. 16, 2019 (KR) .......................... 10-2019-0128629

(51) Int. Cl.

| | |
|---|---|
| *H04N 7/14* | (2006.01) |
| *H04N 7/15* | (2006.01) |
| *G06F 3/14* | (2006.01) |
| *H04M 1/02* | (2006.01) |
| *G06F 3/0482* | (2013.01) |
| *H04M 1/72469* | (2021.01) |

(52) U.S. Cl.
CPC .............. *H04N 7/15* (2013.01); *G06F 3/0482* (2013.01); *G06F 3/1423* (2013.01); *H04M 1/0245* (2013.01); *H04M 1/0268* (2013.01); *H04M 1/72469* (2021.01); *H04M 2201/50* (2013.01)

(58) Field of Classification Search
None
See application file for complete search history.

(56) References Cited

U.S. PATENT DOCUMENTS

| | | | |
|---|---|---|---|
| 10,044,977 B2 * | 8/2018 | Jeong | ...................... G06F 3/167 |
| 10,354,566 B2 | 7/2019 | Kwon et al. | |
| 10,389,974 B2 * | 8/2019 | Astavans | ............... H04N 7/147 |

(Continued)

FOREIGN PATENT DOCUMENTS

| | | |
|---|---|---|
| CN | 109151367 A | 1/2019 |
| JP | 2013-9335 A | 1/2013 |
| KR | 10-2014-0025931 A | 3/2014 |

*Primary Examiner* — Quoc D Tran
(74) *Attorney, Agent, or Firm* — Cha & Reiter, LLC

(57) ABSTRACT

An electronic device is disclosed, including: a housing foldable along at least one axis, a first display disposed on a first surface of the housing, the first display flexible as to switch from an unfolded state to a folded state along the at least one axis, a second display, separate from the first display, disposed on a second surface of the housing opposite to the first surface, and a processor. The processor is configured to: execute a video call including display of a plurality of call targets on the first display, and based on detecting a switch from the unfolded state to the folded state while a number of the plurality of call targets is greater than or equal to a reference value: display a thumbnail of at least one selected call target from among the plurality of call targets in a first sub-region on the second display, and display thumbnails of unselected call targets from among the plurality of call targets in a second sub-region different from the first sub-region on the second display.

20 Claims, 22 Drawing Sheets

(56) References Cited

U.S. PATENT DOCUMENTS

| | | | |
|---|---|---|---|
| 2007/0053657 A1* | 3/2007 | Hamada | G11B 27/031 386/241 |
| 2012/0060089 A1* | 3/2012 | Heo | G06F 3/1431 715/702 |
| 2014/0055429 A1 | 2/2014 | Kwon et al. | |
| 2014/0184723 A1* | 7/2014 | Morrison | H04L 65/80 348/14.07 |
| 2015/0325216 A1* | 11/2015 | Park | G06F 1/1641 345/634 |
| 2016/0132074 A1* | 5/2016 | Kim | G06F 1/1652 715/769 |
| 2017/0115944 A1* | 4/2017 | Oh | G06F 1/1694 |
| 2017/0280098 A1* | 9/2017 | Sethuraman | H04N 7/15 |
| 2018/0374411 A1* | 12/2018 | Yang | A63F 13/25 |
| 2020/0326900 A1* | 10/2020 | Kwon | G06F 3/1446 |

\* cited by examiner

ELECTRONIC DEVICE INCLUDING FLEXIBLE DISPLAY

CROSS-REFERENCE TO RELATED APPLICATION(S)

This application is based on and claims priority under 35 U.S.C. § 119 to Korean Patent Application No. 10-2019-0128629, filed on Oct. 16, 2019, in the Korean Intellectual Property Office, the disclosure of which is incorporated by reference herein its entirety.

BACKGROUND

1. Field

The disclosure relates to an electronic device including a flexible display, and, more particularly to using deformation of the flexible display to control one or more communication functions.

2. Description of Related Art

Nowadays, a flexible displays capable of being bending and contortion are being developed. Because the flexible display may be used in a folded or curved form, they are adaptable to various usages and technological fields. The flexible display may include display elements arranged on a flexible substrate.

Some of these display elements include, for example, organic light emitting diodes (OLED), liquid crystal display (LCD) elements, and electrophoretic display (EPD) elements. At present, such display elements as these listed are capable of being applied to the flexible display. OLED may have excellent flexibility because the OLED elements may be manufactured in a thin film-type stacked structure. Thus OLED is currently a popular display element for implementation of flexible displays.

The flexible display may be classified into different types, including a rollable display capable of being stowed in the form of a roll, a foldable display capable of folding like a paper along a seam, and a stretchable display capable of being deformed as to increase or decrease in size, depending on the degree of bending or other application of force.

The above information is presented as background information only to assist with an understanding of the disclosure. No determination has been made, and no assertion is made, as to whether any of the above might be applicable as prior art with regard to the disclosure.

SUMMARY

Accordingly, an aspect of the disclosure is to provide an electronic device including a flexible display that is capable of displaying call targets in various manners, based on a change in display size during a multilateral video call.

Aspects of the disclosure are to address at least the above-mentioned problems and/or disadvantages and to provide at least the advantages described below.

In accordance with an aspect of the disclosure, an electronic device may include a housing foldable along at least one axis, a first display disposed on a first surface of the housing, the first display flexible as to switch from an unfolded state to a folded state along the at least one axis, a second display, separate from the first display, disposed on a second surface of the housing opposite to the first surface, a processor operatively connected to the first display and the second display, wherein the processor is configured to: execute a video call including display of a plurality of call targets on the first display, and based on detecting a switch from the unfolded state to the folded state while a number of the plurality of call targets is greater than or equal to a reference value: display a thumbnail of at least one selected call target from among the plurality of call targets in a first sub-region on the second display, and display thumbnails of unselected call targets from among the plurality of call targets in a second sub-region different from the first sub-region on the second display.

In accordance with another aspect of the disclosure, an electronic device may include a housing foldable along at least one axis, a first display disposed on a first surface of the housing, the first display flexible as to switch from an unfolded state to a folded state along the at least one axis, a second display, separate from the first display, disposed on a second surface of the housing opposite to the first surface, a processor operatively connected to the first display and the second display, wherein the processor is configured to: execute a video call, display a first thumbnail representing a current call target participating in the video call, with a first size on the second display, detect addition of a new call target participating in the video call, display the first thumbnail representing the current call target in a first sub-region on the second display, wherein the thumbnail of the current call target is reduced in size to be smaller than the first size, and display a second thumbnail representing the new call target in a second sub-region on the second display, the second sub-region different from the first sub-region.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, certain embodiments of the disclosure may be described with reference to accompanying drawings. Accordingly, those of ordinary skill in the art will recognize that modification, equivalent, and/or alternative on the certain embodiments described herein can be variously made without departing from the disclosure.

Figure 1:
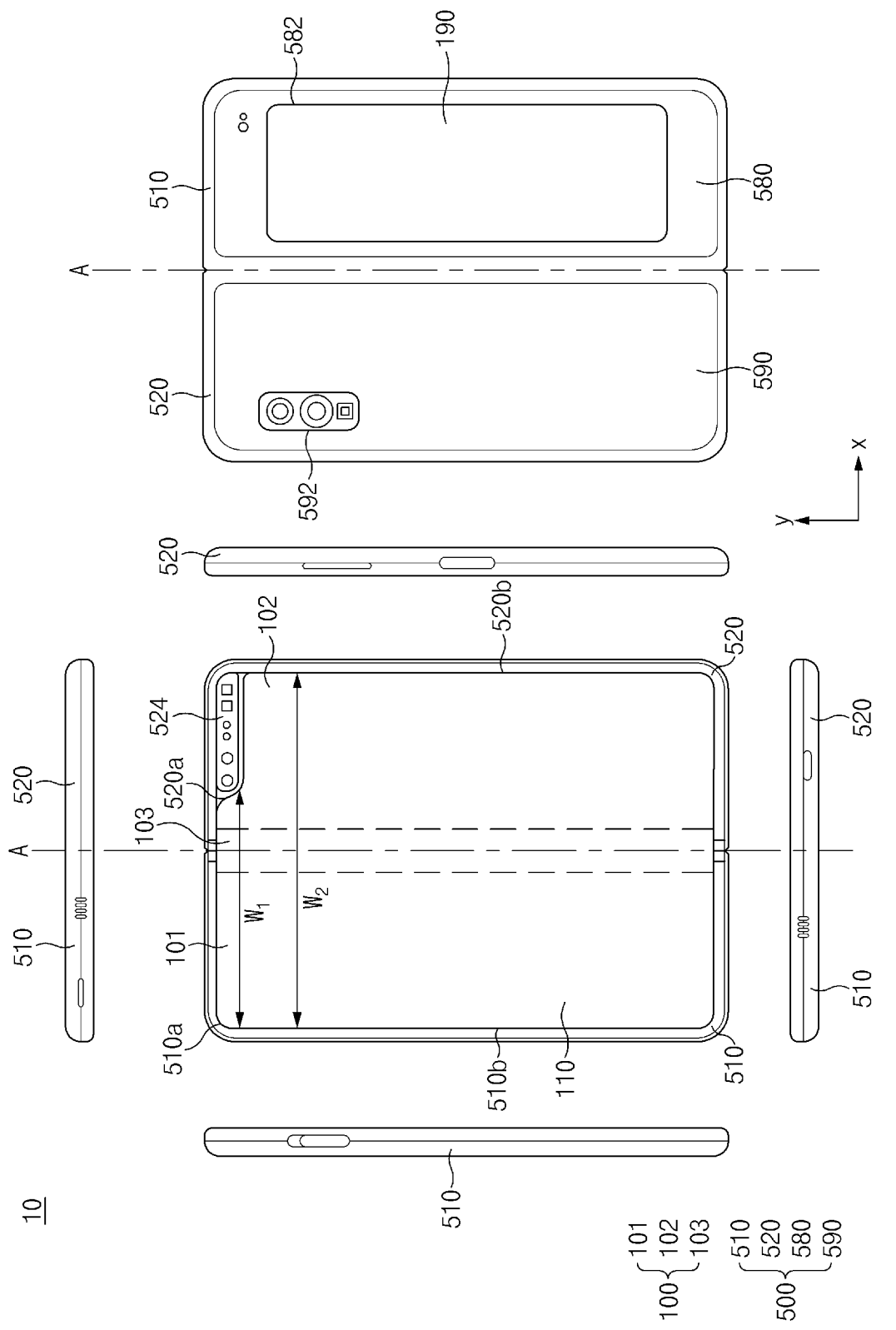
FIG. 1 is a view illustrating a flat state of an electronic device according to an embodiment.
Figure 2:
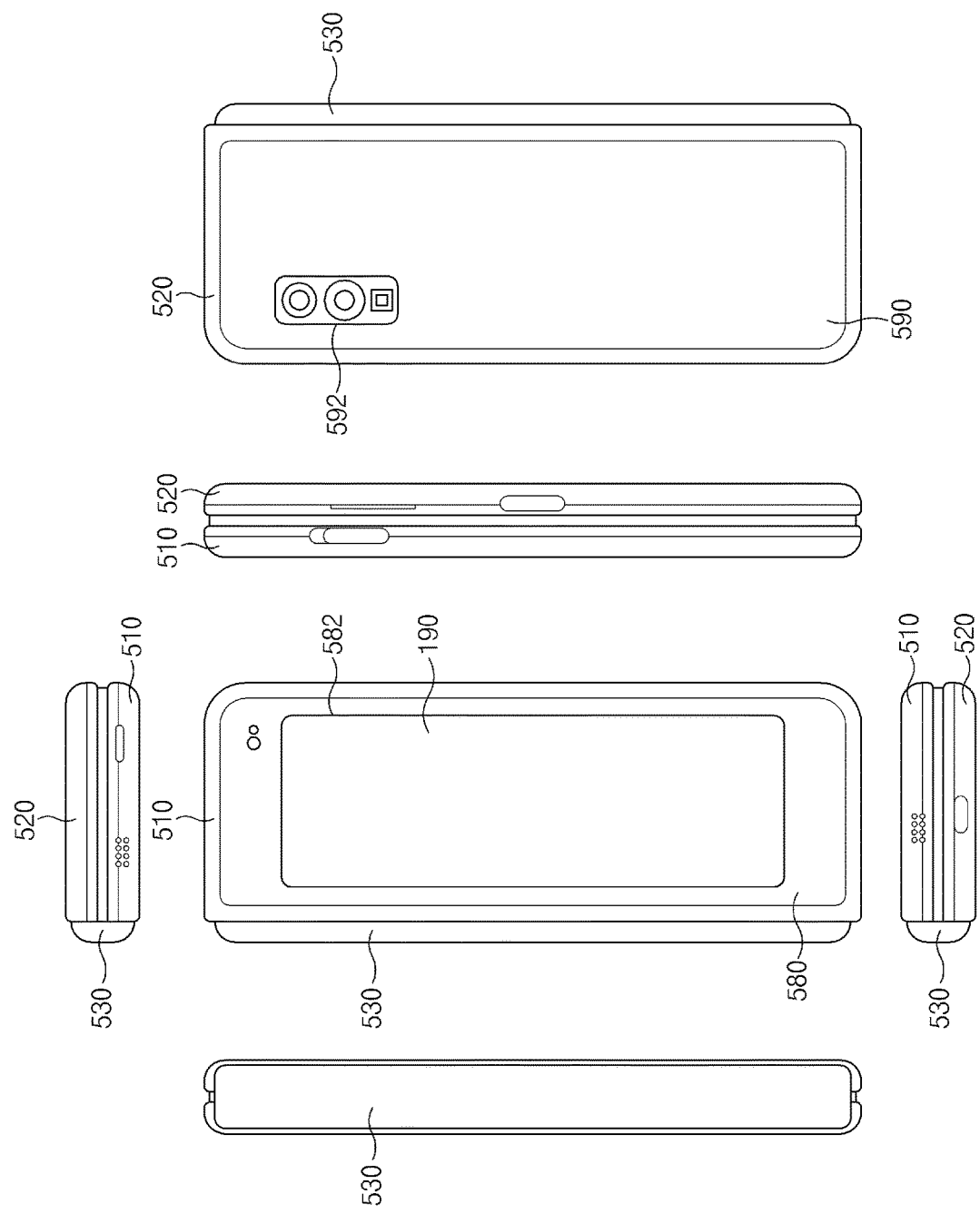
FIG. 2 is a view illustrating a folded state of an electronic device according to an embodiment.

FIG. 1 is a view illustrating a flat state of an electronic device according to an embodiment. FIG. 2 is a view illustrating a folded state of an electronic device according to an embodiment.

Referring to FIGS. 1 and 2, an electronic device 10 may include foldable housing 500, a hinge cover 530 capable of covering a foldable portion of the foldable housing 500, and a first display 100 (e.g., a flexible or foldable display) arranged inside a space formed by the foldable housing 500. In this specification, a surface on which the first display 100 is disposed defines a first surface or a front surface of the electronic device 10. A surface facing away from the front surface defines a second surface or a back surface of the electronic device 10. Also, a surface surrounding a space between the first surface and the second surface defines a third surface or a side surface of the electronic device 10.

In an embodiment, the foldable housing 500 may include a first housing structure 510, a second housing structure 520 including a sensor region 524, a first back cover 580, and a second back cover 590. The foldable housing 500 of the electronic device 10 may not be limited to the shape and connection illustrated in FIGS. 1 and 2, and may be implemented in another shape or by a combination and/or connection of other components. For example, in another embodiment, the first housing structure 510 and the first back cover 580 may be integrally formed, and the second housing structure 520 and the second back cover 590 may be integrally formed.

In an embodiment illustrated, the first housing structure 510 and the second housing structure 520 may be disposed on opposite sides with respect to a folding axis (axis "A") and may have an overall symmetrical shape with respect to the folding axis "A". As will be described later, an angle formed by the first housing structure 510 and the second housing structure 520 or a distance between the first housing structure 510 and the second housing structure 520 may vary depending on whether a state of the electronic device 10 is a flat state, a folded state, or an intermediate state. In an embodiment illustrated, unlike the first housing structure 510, the second housing structure 520 may additionally include the sensor region 524 in which various sensors are disposed, but may have a symmetrical shape with the first housing structure 510 in the remaining region.

In an embodiment, as illustrated in FIG. 1, the first housing structure 510 and the second housing structure 520 may form a recess accommodating the first display 100 together. In an embodiment illustrated, due to the sensor region 524, the recess may have two or more different widths in a direction perpendicular to the folding axis "A".

For example, the recess may have (1) a first width w1 between a first portion 510a of the first housing structure 510, which is parallel to the folding axis "A", and a first portion 520a of the second housing structure 520, which is formed at a periphery of the sensor region 524, and (2) a second width w2 defined by a second portion 510b of the first housing structure 510 and a second portion 520b of the second housing structure 520, which does not correspond to the sensor region 524 and is parallel to the folding axis "A". In this case, the second width w2 may be formed to be longer than the first width w1. In other words, the first portion 510a of the first housing structure 510 and the first portion 520a of the second housing structure 520, which are asymmetrical in shape, may form the first width w1 of the recess, and the second portion 510b of the first housing structure 510 and the second portion 520b of the second housing structure 520, which are symmetrical in shape, may form the second width w2 of the recess. In an embodiment, distances of the first portion 520a and the second portion 520b of the second housing structure 520 from the folding axis "A" may be different from each other. The width of the recess is not limited to the example illustrated. In certain embodiments, the recess may have a plurality of widths due to a shape of the sensor region 524 or a portion in which the first housing structure 510 and the second housing structure 520 are asymmetrical in shape.

In an embodiment, at least part of the first housing structure 510 and the second housing structure 520 may be formed of a metal material or a nonmetal material having rigidity of a magnitude selected to support the first display 100.

In an embodiment, the sensor region 524 may be formed adjacent to one corner of the second housing structure 520 so as to have a certain region. However, the disposition, shape, and size of the sensor region 524 are not limited to the example illustrated. For example, in another embodiment, the sensor region 524 may be provided at another corner of the second housing structure 520 or in any region between an upper corner and a lower corner. In an embodiment, components that are embedded in the electronic device 10 for the purpose of performing various functions may be exposed on the front surface of the electronic device 10 through the sensor region 524 or through one or more openings provided in the sensor region 524. In certain embodiments, the components may include various kinds of sensors. The components may include, for example, at least one of a front camera, a receiver, or a proximity sensor.

The first back cover 580 may be disposed on one side of the back surface of the electronic device 10 with respect to the folding axis "A" and may have, for example, a substantially rectangular periphery, and the periphery may be surrounded by the first housing structure 510. As in the above description, the second back cover 590 may be disposed on another side of the back surface of the electronic device 10 with respect to the folding axis "A", and a periphery thereof may be surrounded by the second housing structure 520.

In an embodiment illustrated, the first back cover 580 and the second back cover 590 may have a substantially symmetrical shape with respect to the folding axis "A". However, the shape of the first back cover 580 and the second back cover 590 may not be limited to the substantially symmetrical shape. In another embodiment, the electronic device 10 may include the first back cover 580 and the second back cover 590 of various shapes. In another embodiment, the first back cover 580 may be integrally formed with the first housing structure 510, and the second back cover 590 may be integrally formed with the second housing structure 520.

In an embodiment, the first back cover 580, the second back cover 590, the first housing structure 510, and the second housing structure 520 may form a space where various components (e.g., a printed circuit board or battery) of the electronic device 10 are disposed. In an embodiment, one or more components may be disposed on the back surface of the electronic device 10 and may be visually exposed. For example, at least part of a second display 190 (e.g., a sub-display) may be visually exposed through a first back region 582 of the first back cover 580. In another embodiment, one or more components or sensors may be visually exposed through a second back region 592 of the second back cover 590. In certain embodiments, the component or sensor may include a rear camera and/or a proximity sensor.

Referring to FIG. 2, the hinge cover 530 may be disposed between the first housing structure 510 and the second housing structure 520 to cover an inner component (e.g., a hinge structure). In an embodiment, depending on a state (e.g., flat state or folded state) of the electronic device 10, the hinge cover 530 may be covered by a portion of the first housing structure 510 and the second housing structure 520 or may be exposed to the outside.

According to an embodiment, as illustrated in FIG. 1, in the case where the electronic device 10 is in the flat state, the hinge cover 530 may be covered by the first housing structure 510 and the second housing structure 520 and may not be exposed. For example, as illustrated in FIG. 2, in the case where the electronic device 10 is in the folded state (e.g., a fully folded state), the hinge cover 530 may be exposed between the first housing structure 510 and the second housing structure 520. For example, in the case of an intermediate state where the first housing structure 510 and the second housing structure 520 are folded with a certain angle, a portion of the hinge cover 530 may be exposed to the outside between the first housing structure 510 and the second housing structure 520. However, in this case, the exposed region may be smaller than in the fully folded state. In an embodiment, the hinge cover 530 may include a curved surface.

The first display 100 may be disposed on a space defined by the foldable housing 500. For example, the first display 100 may be seated on the recess formed by the foldable housing 500 and may form most of the front surface of the electronic device 10. Accordingly, the front surface of the electronic device 10 may include the first display 100, a partial region of the first housing structure 510, a partial region of the second housing structure 520, and the partial regions thereof may be adjacent to the first display 100. The back surface of the electronic device 10 may include the first back cover 580, the second display 190, a partial region of the first housing structure 510 adjacent to the first back cover 580, the second back cover 590, and a partial region of the second back cover 590 adjacent to the second back cover 590.

According to an embodiment, the first display 100 may mean a display, at least part of which is able to be deformed to a flat surface or a curved surface. For example, the first display 100 may include a folding region 103, a first region 101 disposed on one side (a left side of the folding region 103 illustrated in FIG. 1) with respect to the folding region 103, and a second region 102 disposed on an opposite side (a right side of the folding region 103 illustrated in FIG. 1). However, the division of the first display 100 into regions, which is described with reference to FIG. 1, is an example, and the first display 100 may be divided into a plurality of (e.g., four or more or two) regions depending on a structure or function thereof. For example, in the embodiment illustrated in FIG. 1, the first display 100 may be divided into regions by the folding region 103 or the folding axis "A" extending parallel to a y-axis. However, in another embodiment, the first display 100 may be divided into regions with respect to another folding region (e.g., a folding region parallel to an x-axis) or another folding axis (e.g., a folding axis parallel to the x-axis).

According to an embodiment, the first region 101 and the second region 102 may have an overall symmetrical shape with respect to the folding region 103. However, unlike the first region 101, the second region 102 may include a notch that is cut depending on the existence of the sensor region 524 but may be symmetrical to the first region 101 in shape in the remaining region. In other words, the first region 101 and the second region 102 may include a portion having a symmetrical shape and a portion having an asymmetrical shape.

Below, there will be described an operation of the first housing structure 510 and the second housing structure 520 and each region of the first display 100 depending on a state (flat state or folded state) of the electronic device 10.

In an embodiment, when the electronic device 10 is in the flat state (e.g., FIG. 1), the first housing structure 510 and the second housing structure 520 may form an angle of 180 degrees and may be disposed to face the same direction. In the first display 100, a surface of the first region 101 and a surface of the second region 102 may form an angle of 180 degrees and may face the same direction (e.g., a front direction of an electronic device). The folding region 103 may form the same plane as the first region 101 and the second region 102.

In an embodiment, when the electronic device 10 is in the folded state (e.g., FIG. 2), the first housing structure 510 and the second housing structure 520 may be disposed to face each other. In the first display 100, the surface of the first region 101 and the surface of the second region 102 may form a narrow angle (e.g., between 0 degrees and 10 degrees) and may face each other. At least part of the folding region 103 may be formed of a curved surface having a certain curvature.

In an embodiment, when the electronic device 10 is in the intermediate state, the first housing structure 510 and the second housing structure 520 may be disposed with a certain angle. In the first display 100, the surface of the first region 101 and the surface of the second region 102 may form an angle greater than in the folded state and smaller than in the flat state. At least part of the folding region 103 may be formed of a curved surface having a certain curvature; in this case, the curvature may be smaller than in the folded state.

According to certain embodiments (not illustrated), the folded state of the electronic device 10 may be implemented using an out-folding scheme. For example, in the folded state upon using an out-folding scheme, the first back cover 580 and the second back cover 590 may form a narrow angle (e.g., between 0 degrees and 10 degrees) and may face each other. In the folded state upon using an out-folding scheme, the first display 100 may be displayed facing the outside, and the first region 101 and the second region 102 of the first display 100 may be positioned to face directions opposite to each other. For example, in the folded state upon using an out-folding scheme, the partial region (e.g., one of the first region 101 and the second region 102, a region where the camera is positioned, or a region where a user's gaze is facing) of the first display 100 may be activated (e.g., to the exclusion of other regions), and a camera (e.g., a camera positioned in the sensor region 524) positioned in the active partial region may be activated.

Figure 3:
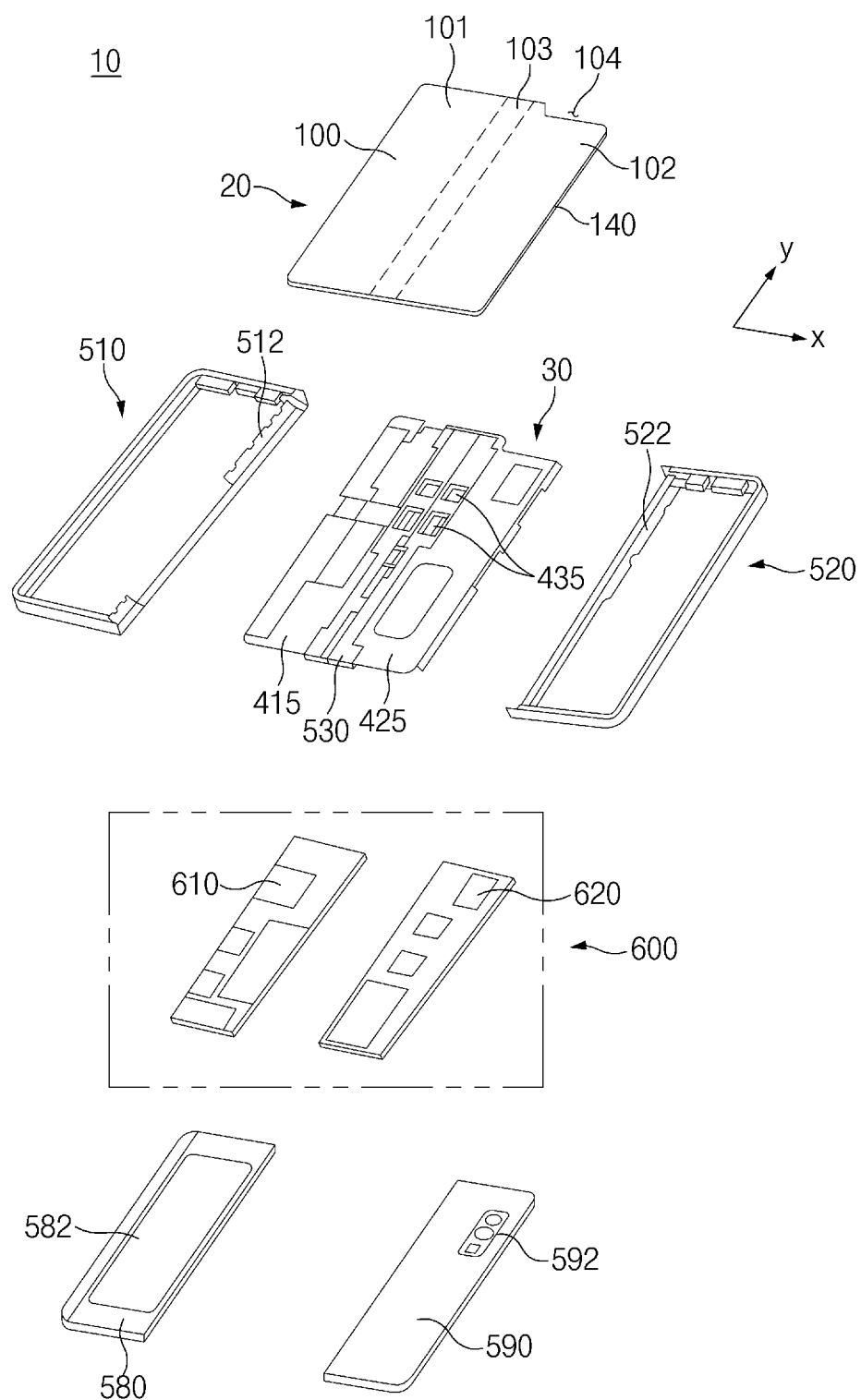
FIG. 3 is an exploded perspective view of an electronic device according to an embodiment.

FIG. 3 is an exploded perspective view of an electronic device according to an embodiment.

Referring to FIG. 3, in an embodiment, the electronic device 10 may include a display unit 20, a bracket assembly 30, a substrate part 600, the first housing structure 510, the second housing structure 520, the first back cover 580, and the second back cover 590. In the specification, the display unit 20 may be called a "display module" or a "display assembly".

According to an embodiment, the display unit 20 may include the first display 100, and at least one plate or layer 140 where the first display 100 is seated. For example, the plate 140 may be interposed between the first display 100 and the bracket assembly 30. The first display 100 may be disposed on at least part of one surface (e.g., an upper surface with respect to FIG. 3) of the plate 140. The plate 140 may be formed in a shape corresponding to a shape of the first display 100. For example, a partial region of the plate 140 may be formed in a shape corresponding to a notch 104 of the first display 100.

According to an embodiment, the bracket assembly 30 may include a first bracket 415, a second bracket 425, a hinge structure interposed between the first bracket 415 and the second bracket 425, the hinge cover 530 covering the hinge structure when viewed from the outside, and a wiring member 435 (e.g., a flexible printed circuit (FPC)) crossing the first bracket 415 and the second bracket 425.

According to an embodiment, the bracket assembly 30 may be interposed between the plate 140 and the substrate part 600. For example, the first bracket 415 may be interposed between the first region 101 of the first display 100 and a first substrate 610. The second bracket 425 may be interposed between the second region 102 of the first display 100 and a second substrate 620.

According to an embodiment, at least part of the wiring member 435 and the hinge structure may be disposed in the bracket assembly 30. The wiring member 435 may be disposed in a direction (e.g., an x-axis direction) crossing the first bracket 415 and the second bracket 425. The wiring member 435 may be disposed in a direction (e.g., the x-axis direction) perpendicular to a folding axis (e.g., the y-axis or the folding axis "A" of FIG. 1) of the folding region 103.

According to an embodiment, as described above, the substrate part 600 may include the first substrate 610 disposed on a side of the first bracket 415 and the second substrate 620 disposed on a side of the second bracket 425. The first substrate 610 and the second substrate 620 may be disposed in a space defined by the bracket assembly 30, the first housing structure 510, the second housing structure 520, the first back cover 580, and the second back cover 590. Components for implementing various functions of the electronic device 10 may be mounted on the first substrate 610 and the second substrate 620.

According to an embodiment, the first housing structure 510 and the second housing structure 520 may be assembled to be connected on opposite sides of the bracket assembly 30 while the display unit 20 is connected with the bracket assembly 30. As will be described later, the first housing structure 510 and the second housing structure 520 may be slid from the opposite sides of the bracket assembly 30 so as to be connected with the bracket assembly 30.

According to an embodiment, the first housing structure 510 may include a first rotation support surface 512, and the second housing structure 520 may include a second rotation support surface 522 corresponding to the first rotation support surface 512. The first rotation support surface 512 and the second rotation support surface 522 may include a curved surface corresponding to the curved surface included in the hinge cover 530.

According to an embodiment, when the electronic device 10 is in the flat state (e.g., the electronic device of FIG. 1), the first rotation support surface 512 and the second rotation support surface 522 may cover the hinge cover 530, and thus, the hinge cover 530 may not be exposed toward the back surface of the electronic device 10 or may be exposed to a minimum. Meanwhile, when the electronic device 10 is in the folded state (e.g., the electronic device of FIG. 2), the first rotation support surface 512 and the second rotation support surface 522 may rotate along the curved surface included in the hinge cover 530, and thus, the hinge cover 530 may be maximally exposed toward the back surface of the electronic device 10.

Figure 4:
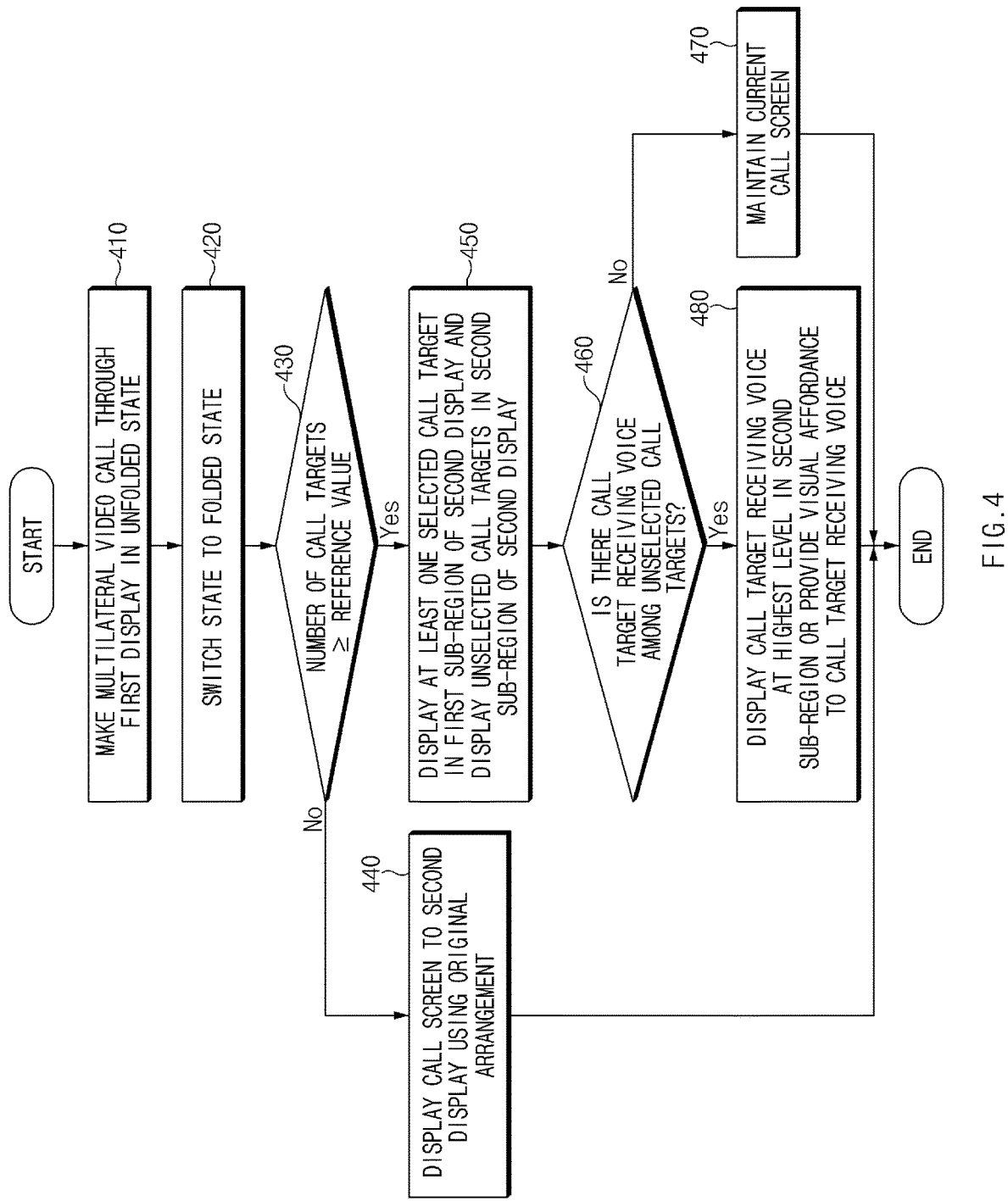
FIG. 4 is a flowchart illustrating a method of displaying a call target according to display switching during a multilateral video call in an electronic device, according to an example embodiment.

FIG. 4 is a flowchart illustrating a method of displaying a call target according to display switching during a multilateral video call in an electronic device, according to an example embodiment.

Referring to FIGS. 1 to 4, the electronic device 10 may activate the first display 100 (e.g., a flexible display) and a first camera (e.g., a camera facing the same direction as the first display 100) in the unfolded state. The electronic device 10 may activate the second display 190 (e.g., a sub-display) and a second camera (e.g., a camera facing the same direction as the second display 190) in the folded state. In certain embodiments, the electronic device 10 may be implemented in an out-folding scheme. In the out-folding scheme, in a state where the electronic device 10 is in a folded state, a partial region (e.g., one of the first region 101 or the second region 102) of the first display 100 and the first camera (e.g., a camera facing the same direction as the activated region of the first display 100) may be activated.

According to an embodiment, in operation 410, the electronic device 10 may execute a multilateral video call through the first display 100 in the unfolded state. For example, the electronic device 10 may display thumbnails of a plurality of call targets (e.g., contacts and other participants in the video call) through the first display 100.

According to an embodiment, in operation 420, the electronic device 10 may be switched from an unfolded state to a folded state. For example, when the electronic device 10 is switched to the folded state, the processor of the electronic device 10 may determine whether the electronic device 10 is switched to the folded state, through a sensor (e.g., a proximity sensor) positioned on the side surface (e.g., the first surface of the electronic device 10) where the first display 100 is positioned. When it is determined that the state of the electronic device 10 is switched to the folded state, the processor may deactivate the first display 100 and may activate the second display 190.

According to certain embodiments, in the out-folding scheme, when the electronic device 10 is switched to the folded state, the processor may determine whether the electronic device 10 is switched to the folded state, through a sensor arranged in the direction of the first back cover 580 or the second back cover 590. In the out-folding scheme, when it is determined that the electronic device 10 is switched to the folded state, the processor may activate the partial region (e.g., one of the first region 101 or the second region 102 to the exclusion of the other) of the first display 100.

According to an embodiment, in operation 430, the processor may compare the number of call targets (e.g., current video call participants) with a reference value (e.g., 4 persons). For example, when the number of call targets is less than the reference value, the processor may perform operation 440. When the number of call targets is greater than or equal to the reference value, the electronic device 10 may perform operation 450.

According to an embodiment, in operation 440, the processor may identically display the call screen, which is displayed on the first display 100 in operation 410, through the second display 190. For example, the electronic device 10 may display the thumbnails of call targets on the second display 190 while maintaining the placement relationship or size ratio of the thumbnails of the call targets. In other words, when the count of participants is less than the reference value, the original arrangement of the participants (as displayed on the first screen prior to folding) may be maintained when the participants are displayed to the second screen and the first screen is deactivated.

According to certain embodiments, in the out-folding scheme, the processor may display a call screen displayed on the entire first display 100 through a partial region (e.g., one of the first region 101 or the second region 102 to the exclusion of the other) of the first display 100 in the same manner. For example, the electronic device 10 may display thumbnails of call targets in a partial region (e.g., one of the first region 101 or the second region 102 to the exclusion of the other) of the first display 100 while maintaining the placement relationship or a size ratio of thumbnails of call targets.

According to an embodiment, in operation 450, the processor may display at least one selected call target in the first sub-region of the second display 190. The processor may display unselected call targets in the second sub-region of the second display 190. For example, the first sub-region may be set to a first size. The second sub-region may be set to a second size that is the same as or different from the first size. The thumbnail of the selected call target may be displayed in the size same as or similar to the size in the first sub-region. The thumbnail of each of the unselected call targets may be displayed in a smaller size than the first sub-region. In other words, because the number of participants is greater than the reference value, there is a possibility the original arrangement will not be displayable to the second display, which may be smaller in size than the first display. Accordingly, a different and more compact display arrangement is utilized, involving the first and second sub-regions, and possibly overlapping arrangements of thumbnails of the participants.

According to certain embodiments, in the out-folding scheme, the processor may display at least one selected call target in the first sub-region of a partial region (e.g., one of the first region 101 or the second region 102 to the exclusion of the other) of the first display 100, and may display unselected call targets in the second sub-region.

According to certain embodiments, the selected call target may be determined based on a user input or a predetermined priority. For example, in the unfolded state, the processor may change the selected call target depending on the user input (e.g., touching a specific location of the thumbnail) to the thumbnail of the call target. Alternatively, upon switching from the unfolded state to the folded state, the processor may determine the selected call target among the unselected call targets based on a predetermined priority. For example, the processor may determine the selected call target among the unselected call targets, based on a priority set in a previously stored address book. The processor may determine a call target corresponding to a specific category set in the address book, as the selected call target among the unselected call targets. The processor may determine the call target corresponding to the most recently-used contact in the address book as the selected call target among the unselected call targets.

In certain embodiments, the thumbnails of the unselected call targets may have a hierarchical arrangement depending on a specified priority (e.g., the alphabetical order of call target names or the order of call targets recently receiving a voice), and may be displayed such that portions of the thumbnails overlap with one another. Alternatively, the thumbnails of the unselected call targets may be displayed in list format (or a checkerboard format).

According to an embodiment, in operation 460, the processor may determine whether there is a call target receiving a voice (e.g., someone who is presently speaking to the video call, and thus may be displayed prominently by size or by some type of visual highlighting) among the unselected call targets. For example, when there is no unselected call target receiving a voice, the processor may perform operation 470. When there is an unselected call target receiving a voice, the processor may perform operation 480.

According to an embodiment, in operation 470, when there is no unselected call target receiving a voice, the processor may maintain the current call screen.

According to an embodiment, in operation 480, when there is an unselected call target receiving a voice, the processor may display the thumbnail of the unselected call target receiving a voice depending on the specified display method in the second sub-region. According to an embodiment, for example, when portions of the thumbnails of the unselected call targets are displayed in the second sub-region to overlap with one another, the processor may display the thumbnail of the unselected call target receiving a voice at the highest level in the second sub-region. Alternatively, when the thumbnails of the unselected call targets are displayed in the second sub-region in a list format (or a checkerboard format), the processor may apply a visual affordance (e.g., highlighting the border of the thumbnail) to the thumbnail of an unselected call target receiving a voice.

As described above, during a multilateral video call, the processor may detect the unfolded state or the folded state of the electronic device 10. Upon switching to the folded state, the processor may switch the activated display from the first display 100 to the second display 190 (or switching to a partial region of the first display 100 (e.g., one of the first region 101 or the second region 102 to the exclusion of the other) upon using an out-folding scheme), and may display the screen displayed on the first display 100 on the second display 190 (or upon using an out-folding scheme, displaying the screen as a partial region of the first display 100). Because the size of the second display 190 (or a partial region of the first display 100 upon using an out-folding scheme) is smaller than the size of the first display 100, the thumbnails of call targets may need to be changed in the display method. Accordingly, the processor may display thumbnails of call targets on the second display 190 (or a partial region of the first display 100 in the out-folding scheme) through operation 430 to operation 480, and a method of displaying thumbnails of call targets is described with reference to FIGS. 5A to 17 described later.

Figure 5A:
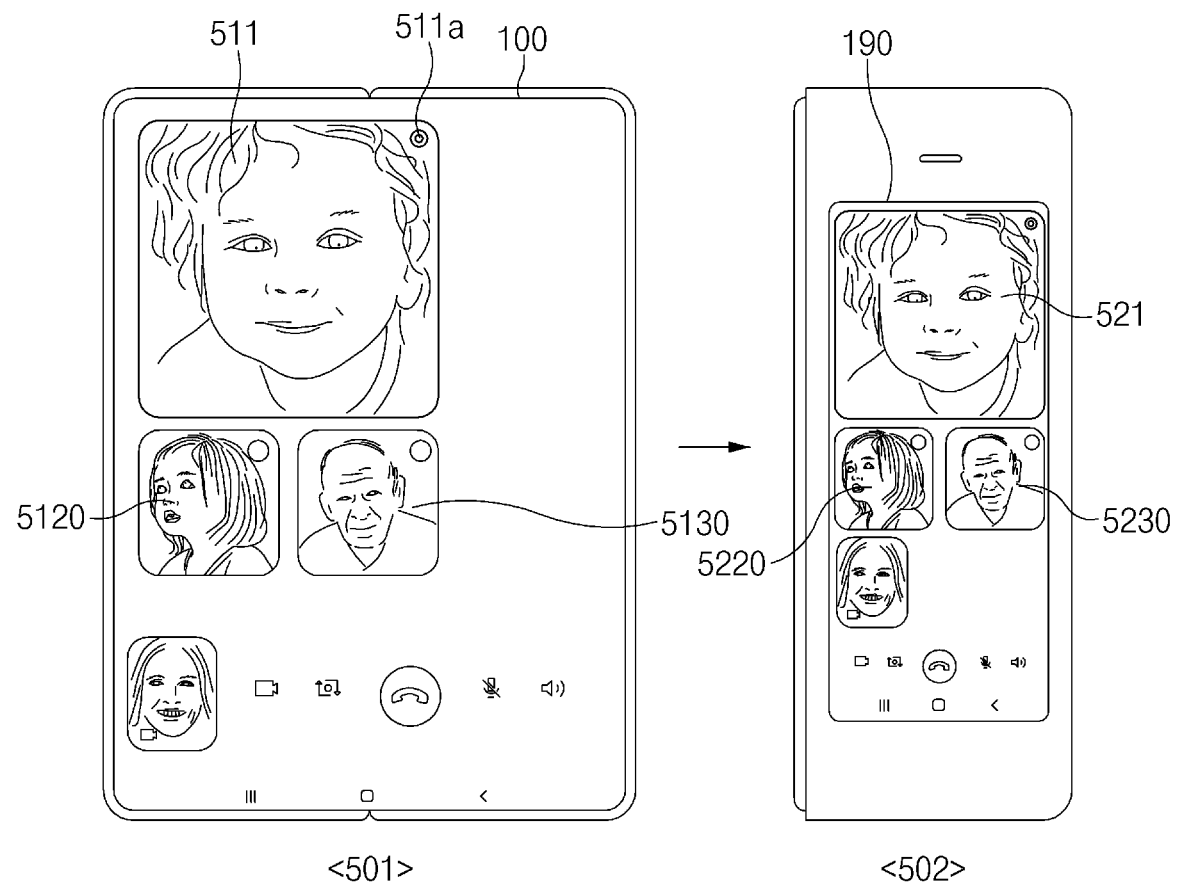
FIG. 5A is a diagram illustrating a method of displaying call targets when the number of call targets is less than a reference value in an electronic device according to an embodiment.
Figure 5B:
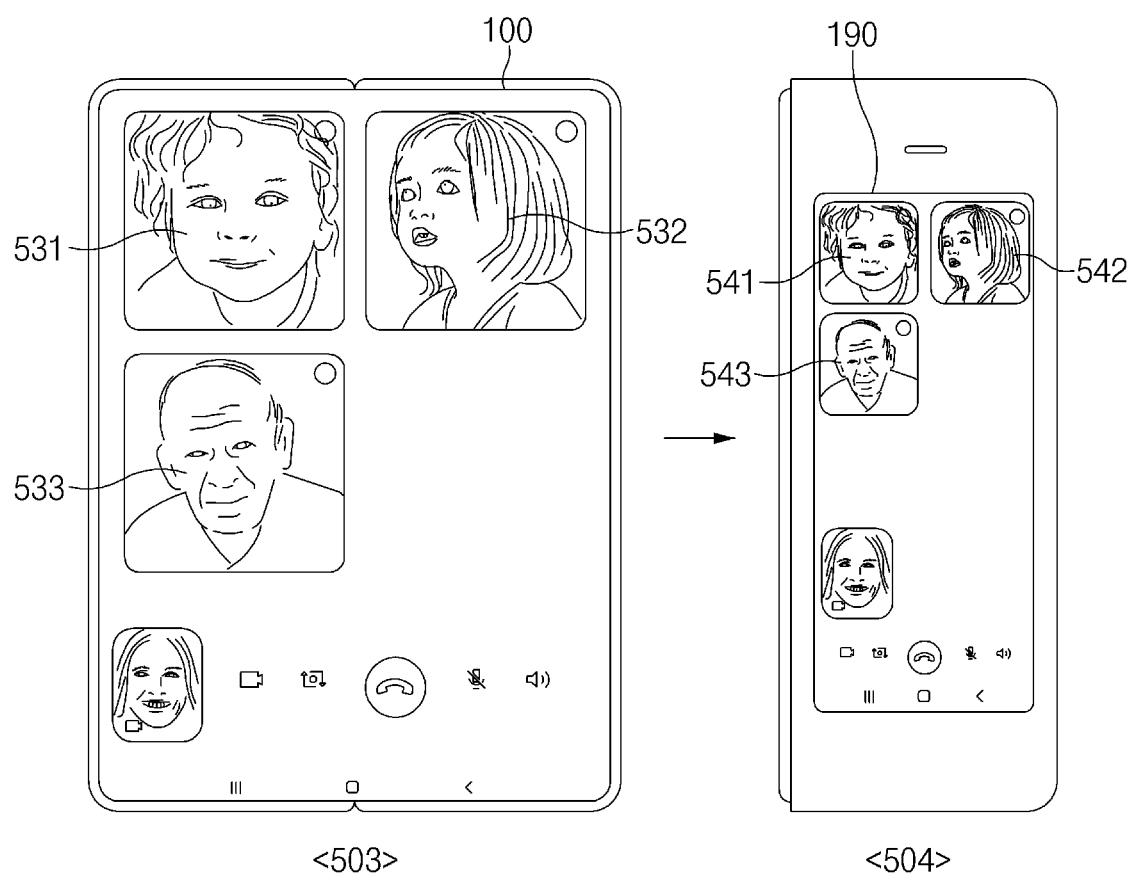
FIG. 5B is a diagram illustrating a method of displaying call targets when the number of call targets is less than a reference value in an electronic device according to certain embodiments.

FIG. 5A is a diagram illustrating a method of displaying call targets when the number of call targets is less than a reference value in an electronic device according to an embodiment. FIG. 5B is a diagram illustrating a method of displaying call targets when the number of call targets is less than a reference value in an electronic device according to certain embodiments.

Referring to FIGS. 5A and 5B, during the multilateral video call, in an unfolded state 501, the processor of the electronic device 10 may activate the first display 100. In the case of switching from the unfolded state 501 to a folded state 502, the processor may deactivate the first display 100, and may activate the second display 190 (or activating a partial region of the first display 100 rather than an entirety upon using an out-folding scheme). When the number of call targets (e.g., 3 persons) is less than the reference value (e.g., 4 persons), the processor may identically or similarly maintain a screen configuration displayed on the first display 100, on the second display 190 (or a partial region of the first display 100 upon using an out-folding scheme). The reference value may be stored in a memory in advance.

According to an embodiment, in FIG. 5A, at least one selected call target may be specified. For example, in the unfolded state 501, the first display 100 may display a thumbnail 511 of the selected call target and thumbnails 5120 and 5130 of unselected call targets. In the folded state 502, the second display 190 (or a partial region of the first display 100 upon using an out-folding scheme) may display a thumbnail 521 of the selected call target and thumbnails 5220 and 5230 of the unselected call targets. The configuration (e.g., a size ratio or placement method) of the thumbnail 521 of the selected call target and the thumbnails 5220 and 5230 of the unselected call targets on the second display 190 (or a partial region of the first display 100 upon using an out-folding scheme) may be the same as or similar to the configuration of the thumbnail 511 of the selected call target and the thumbnails 5120 and 5130 of the unselected call targets on the first display 100. As described above, this may occur when the number of participants is less than a threshold reference number.

According to certain embodiments, in the unfolded state 501, the selected call target may be determined based on a user input or a predetermined priority. For example, the processor may change the selected call target depending on the user input (e.g., touching a specific location 511a of the thumbnail) to the thumbnail of the call target. Alternatively, upon switching from the unfolded state to the folded state, the processor may determine the selected call target among the unselected call targets based on a predetermined priority. For example, the processor may determine the selected call target among the unselected call targets, based on a priority set in a previously stored address book. The processor may determine a call target corresponding to a specific category set in the address book, as the selected call target among the unselected call targets. The processor may determine the call target corresponding to the most recently-used contact in the address book as the selected call target among the unselected call targets.

According to an embodiment, in FIG. 5B, the selected call target may not be specified. For example, in the unfolded state 503, the first display 100 may display thumbnails 531, 532, and 533 of the unselected call targets. In a folded state 504, the second display 190 (or a partial region of the first display 100 upon using an out-folding scheme) may display thumbnails 541, 542, and 543 of the unselected call targets. The configuration (e.g., a size ratio or placement method) of the thumbnails 541, 542, and 543 of the unselected call targets on the second display 190 (or a partial region of the first display 100 upon using an out-folding scheme) may be the same as or similar to the configuration of the thumbnails 531, 532, and 533 of the unselected call targets on the first display 100. As described above, this may occur when the number of participants is less than a threshold reference number.

Figure 6A:
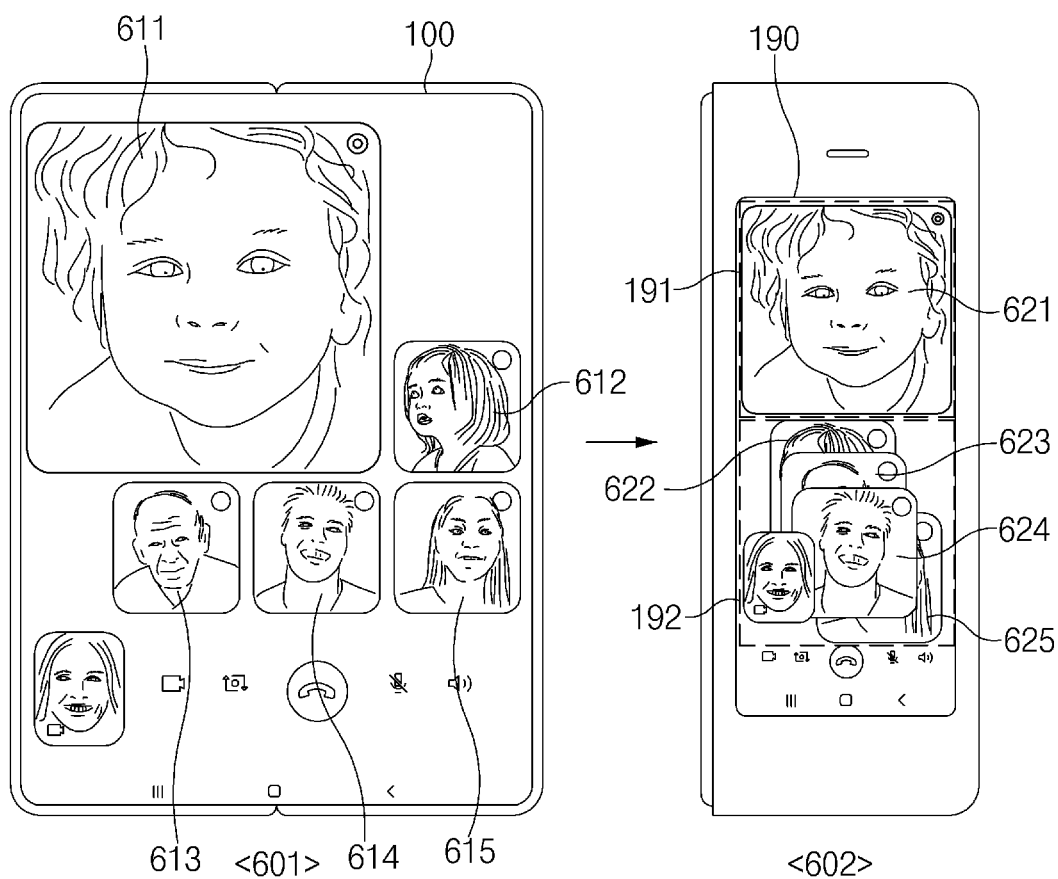
FIG. 6A is a diagram illustrating a method of displaying call targets when the number of call targets is greater than or equal to a reference value in an electronic device according to an embodiment.
Figure 6B:
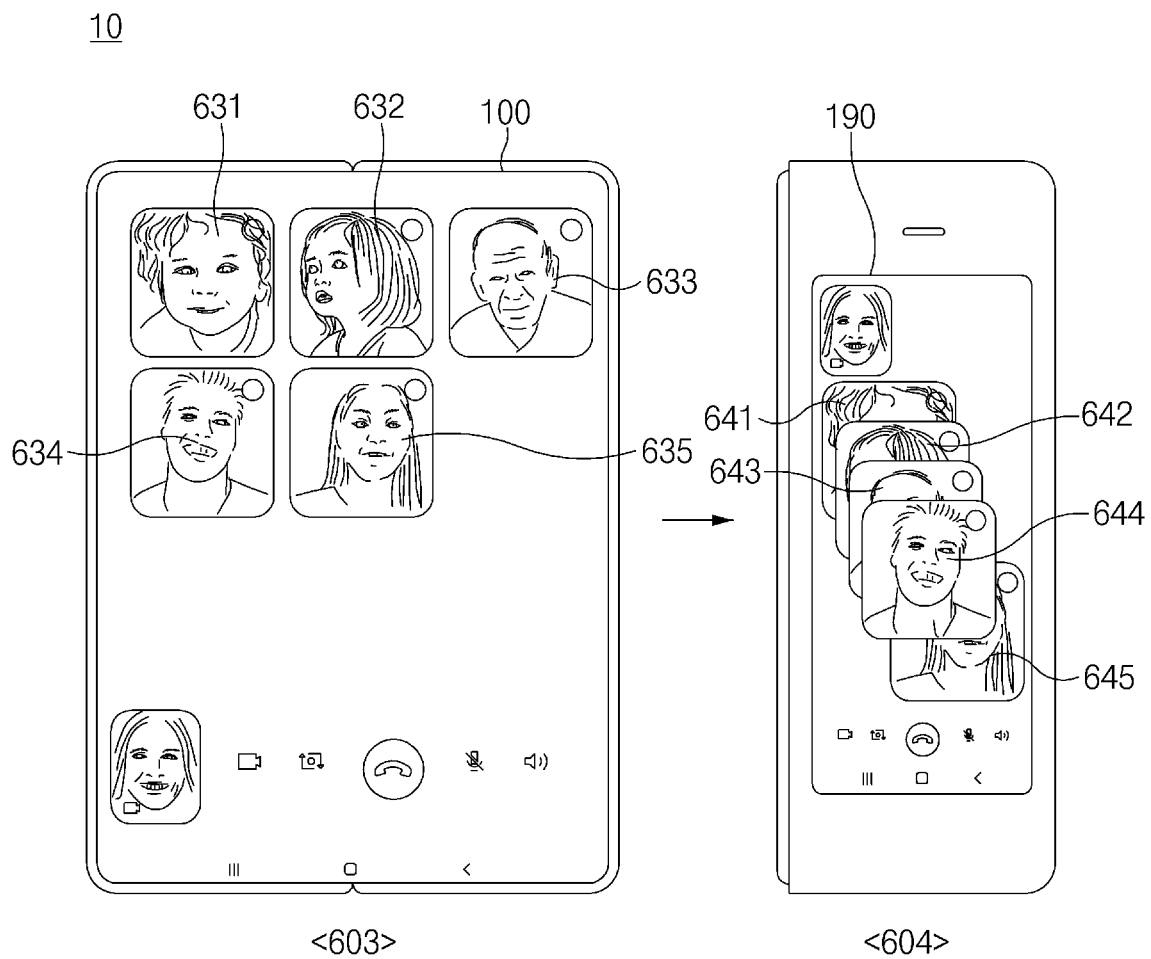
FIG. 6B is a diagram illustrating a method of displaying call targets when the number of call targets is greater than or equal to a reference value in an electronic device according to certain embodiments.

FIG. 6A is a diagram illustrating a method of displaying call targets when the number of call targets is greater than or equal to a reference value in an electronic device according to an embodiment. FIG. 6B is a diagram illustrating a method of displaying call targets when the number of call targets is greater than or equal to a reference value in an electronic device according to certain embodiments.

Referring to FIGS. 6A and 6B, during the multilateral video call, in an unfolded state 601, the processor of the electronic device 10 may activate the first display 100. In the case of switching from the unfolded state 601 to a folded state 602, the processor may deactivate the first display 100, and may activate the second display 190 (or activating a partial region of the first display 100 rather than an entirety upon using an out-folding scheme). When the number of call targets (e.g., 5 persons) is greater than or equal to the reference value (e.g., 4 persons), the processor may display a configuration different from the screen configuration displayed on the first display 100 on the second display 190 (or a partial region of the first display 100 upon using an out-folding scheme).

According to an embodiment, in FIG. 6A, at least one selected call target may be specified. For example, in the unfolded state 601, the first display 100 may display a thumbnail 611 of the selected call target and thumbnails 612, 613, 614, and 615 of unselected call targets. In the folded state 602, the second display 190 (or a partial region of the first display 100 upon using an out-folding scheme) may display a thumbnail 621 of the selected call target and thumbnails 622, 623, 624, and 625 of the unselected call targets. The processor may display the second display 190 by dividing the second display 190 into a first sub-region 191 and a second sub-region 192. The processor may display the thumbnail 621 of the selected call target on the first sub-region 191 of the second display 190 (or a partial region of the first display 100 upon using an out-folding scheme). The processor may display the thumbnails 622, 623, 624, and 625 of the unselected call targets in the second sub-region 192 of the second display 190 (or a partial region of the first display 100 upon using an out-folding scheme). The first sub-region 191 may have a first size. The second sub-region 192 may have a second size identical to or different from the first size. The size of the thumbnail 621 of the selected call target may be set to be equal to or similar to the first size. The size of each of the thumbnails 622, 623, 624, and 625 of the unselected call targets may be set to be smaller than the first size. As noted above, this change in layout may occur when the number of participants is greater than or equal to a preset reference number.

According to certain embodiments, in the second sub-region 192, the thumbnails 622, 623, 624, and 625 of the unselected call targets may have a hierarchical arrangement depending on a specified priority (e.g., the alphabetical order of call target names or the order of call targets recently receiving a voice), and may be displayed such that portions of the thumbnails overlap with one another. Alternatively, the thumbnails 622, 623, 624, and 625 of the unselected call targets may be displayed in a list format (or a checkerboard format).

According to an embodiment, in FIG. 6B, the selected call target may not be specified. For example, in the unfolded state 603, the first display 100 may display thumbnails 631, 632, 633, 634, and 635 of the unselected call targets. In a folded state 604, the second display 190 (or a partial region of the first display 100 upon using an out-folding scheme) may display thumbnails 641, 642, 643, 644, and 645 of the unselected call targets. The configuration (e.g., a size ratio or placement method) of the thumbnails 641, 642, 643, 644, and 645 of the unselected call targets on the second display 190 (or a partial region of the first display 100 upon using an out-folding scheme) may be displayed to be different from the configuration of the thumbnails 631, 632, 633, 634, and 635 of the unselected call targets on the first display 100. As noted above, this change in layout may occur when the number of participants is greater than or equal to a preset reference number.

For example, the thumbnails 641, 642, 643, 644, and 645 of the unselected call targets may have a hierarchical arrangement depending on a specified priority (e.g., the alphabetical order of call target names or the order of recent voice calls), and may be displayed such that portions of the thumbnails overlap with one another. Alternatively, the thumbnails 641, 642, 643, 644, and 645 of the unselected call targets may be displayed in a list format (or a checkerboard format). In certain embodiments, the processor may display the thumbnails 641, 642, 643, 644, and 645 of the unselected call targets on the second display 190 (or a partial region of the first display 100 upon using an out-folding scheme), without region division (e.g., the first sub-region 191 and the second sub-region 192 in FIG. 6A).

Figure 7:
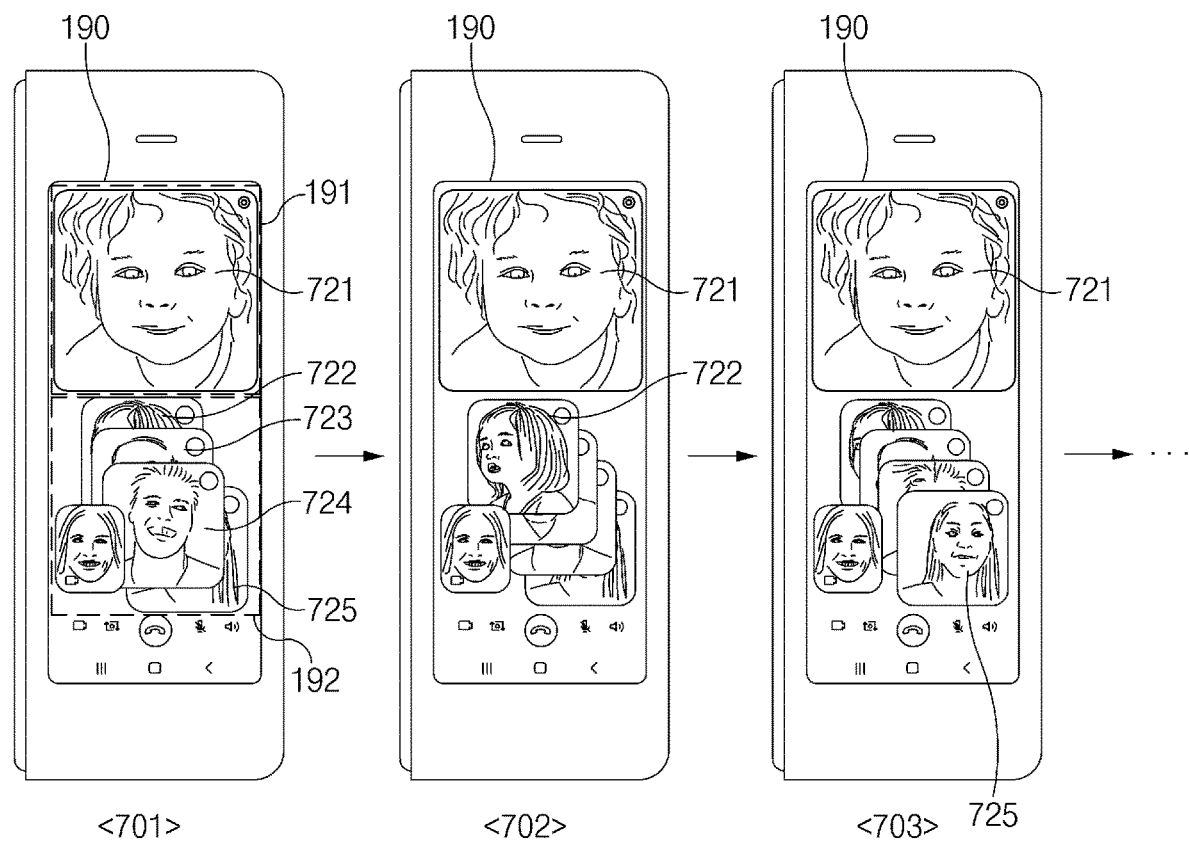
FIG. 7 is a diagram illustrating a method of displaying unselected call targets on a second display (or a partial region of a first display upon using an out-folding scheme) of an electronic device according to an embodiment.
Figure 8:
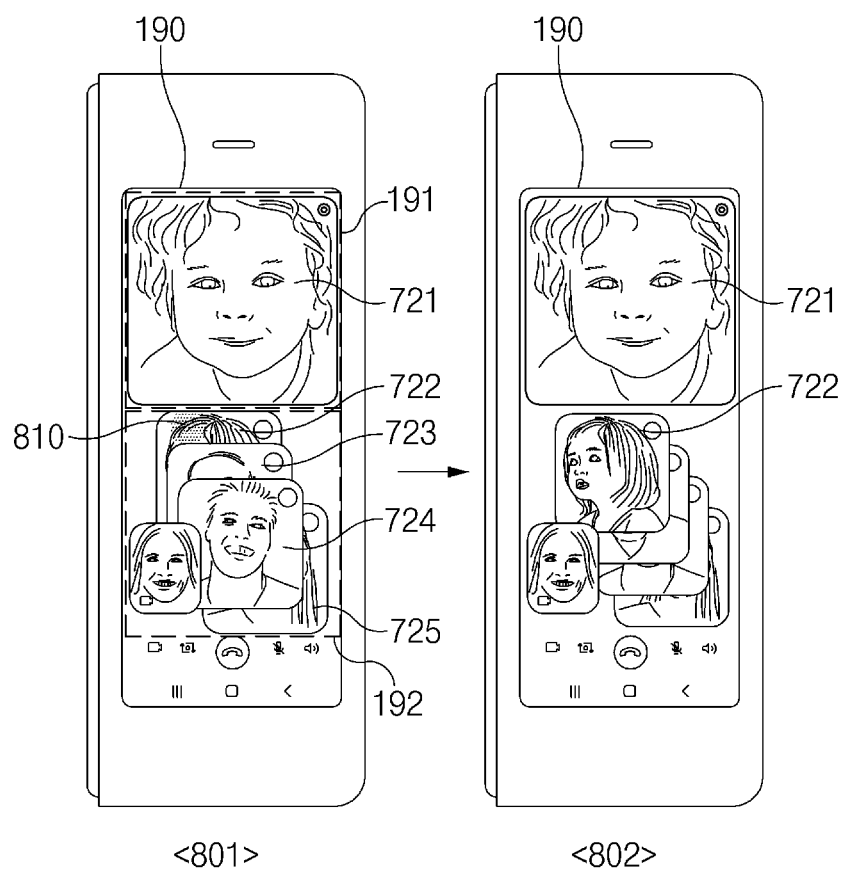
FIG. 8 is a diagram illustrating a method of displaying unselected call targets on a second display (or a partial region of a first display upon using an out-folding scheme) of an electronic device according to certain embodiments.
Figure 9:
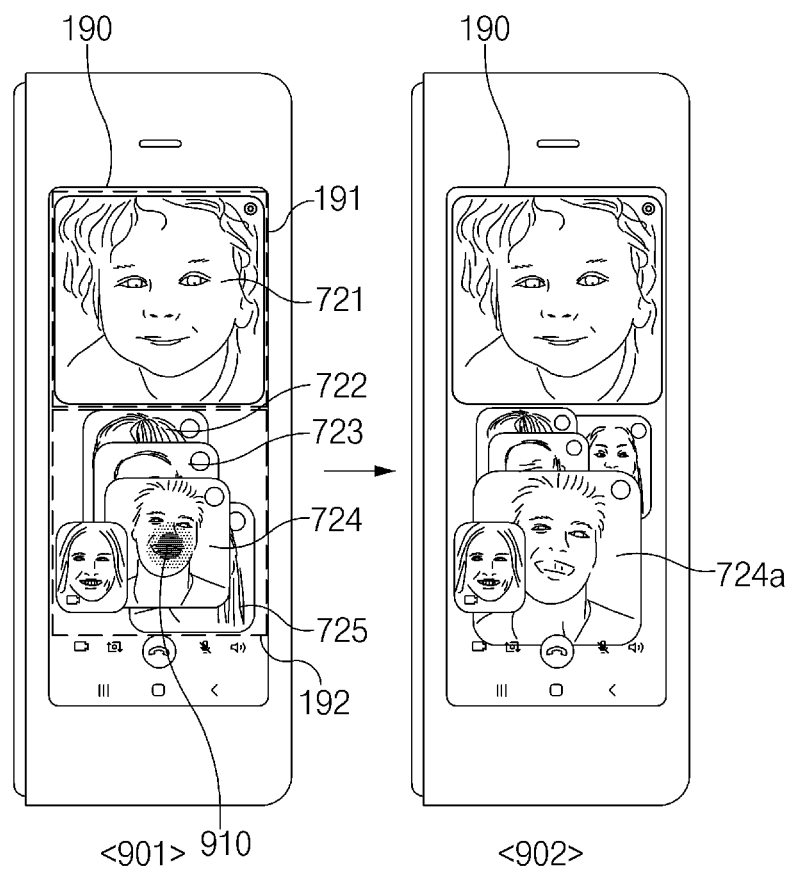
FIG. 9 is a diagram illustrating a method of displaying unselected call targets on a second display (or a partial region of a first display upon using an out-folding scheme) of an electronic device according to certain embodiments.

FIG. 7 is a diagram illustrating a method of displaying unselected call targets on a second display (or a partial region of the first display 100 upon using an out-folding scheme) of an electronic device according to an embodiment. FIG. 8 is a diagram illustrating a method of displaying unselected call targets on a second display (or a partial region of the first display 100 upon using an out-folding scheme) of an electronic device according to certain embodiments. FIG. 9 is a diagram illustrating a method of displaying unselected call targets on a second display of an electronic device according to certain embodiments.

Referring to FIGS. 7 to 9, in a folded state, the processor of the electronic device 10 may display a thumbnail 721 of a selected call target in the first sub-region 191. In the folded state, the processor may display thumbnails 722, 723, 724, and 725 of unselected call targets in the second sub-region 192. The thumbnails 722, 723, 724, and 725 of the unselected call targets may have a hierarchical arrangement and may be displayed such that portions of the thumbnails overlap with one another.

According to an embodiment, in FIG. 7, the processor may display a thumbnail of the unselected call target receiving a voice call at the highest level among the thumbnails 722, 723, 724, and 725 of the unselected call targets. For example, in state 701, state 702, or state 703, the processor may display the thumbnail 724, 722, or 725 of the unselected call targets receiving a voice call, at the highest level in the second sub-region 192.

According to an embodiment, in FIG. 8, the processor may display a thumbnail of a call target corresponding to a user input among the thumbnails 722, 723, 724, and 725 of the unselected call targets at the highest level. For example, in state 801, the processor may receive a user input 810 (e.g., touch) to the thumbnail 722 of the unselected call target. In state 802, the processor may display the thumbnail 722 of the unselected call target corresponding to the user input 810 at the highest level in the second sub-region 192.

According to an embodiment, in FIG. 9, the processor may change the thumbnail of the unselected call target currently displayed at the highest level, based on a user input. For example, in state 901, the processor may receive a user input 910 (e.g., double click) to the thumbnail 724 of the unselected call target currently displayed at the highest level. In state 902, the processor may change (e.g., enlarge) the thumbnail 724 of the unselected call target corresponding to the user input 910 into a thumbnail 724a.

Figure 10:
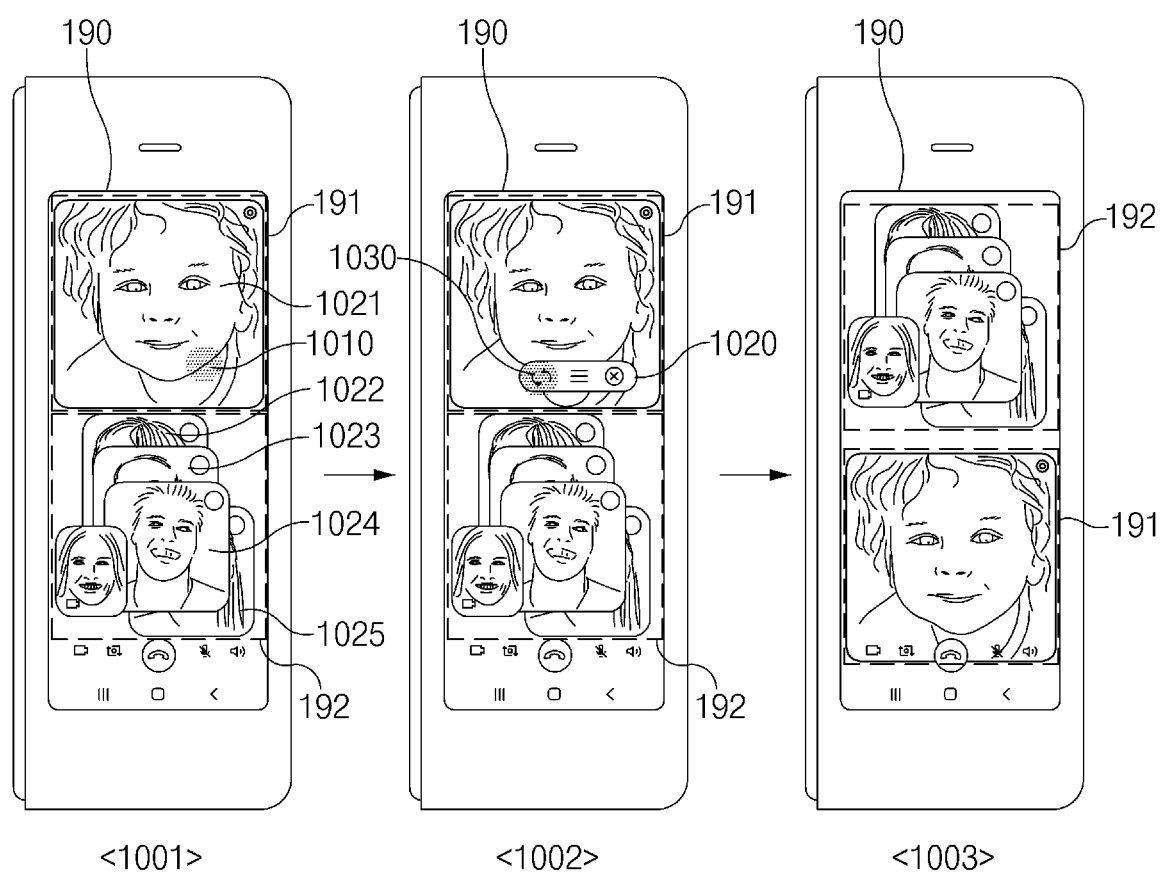
FIG. 10 is a diagram illustrating a method of displaying a first region and a second region in a second display (or a partial region of a first display upon using an out-folding scheme) of an electronic device according to an embodiment.

FIG. 10 is a diagram illustrating a method of displaying a first sub-region and a second sub-region in a second display (or a partial region of the first display 100 upon using an out-folding scheme) of an electronic device according to an embodiment.

Referring to FIG. 10, in a folded state, the processor of the electronic device 10 may display a thumbnail 1021 of a selected call target in a first sub-region 191. In the folded state, the processor may display thumbnails 1022, 1023, 1024, and 1025 of unselected call targets in the second sub-region 192. The thumbnails 1022, 1023, 1024, and 1025 of the unselected call targets may have a hierarchical arrangement and may be displayed such that portions of the thumbnails overlap with one another.

According to an embodiment, in state 1001, the processor may receive a user input 1010 (e.g., touch and hold) in the first sub-region 191. In state 1002, the processor may display a menu object 1020 in the first sub-region 191 in response to the user input 1010. The processor may receive a user input 1030 (e.g., touch) to a portion of the menu object 1020. In state 1003, the processor may change the locations of the first sub-region 191 and the second sub-region 192 in response to the user input 1030. For example, the processor may exchange locations of the first sub-region 191 and the second sub-region 192 with each other depending on the user input 1030.

Figure 11:
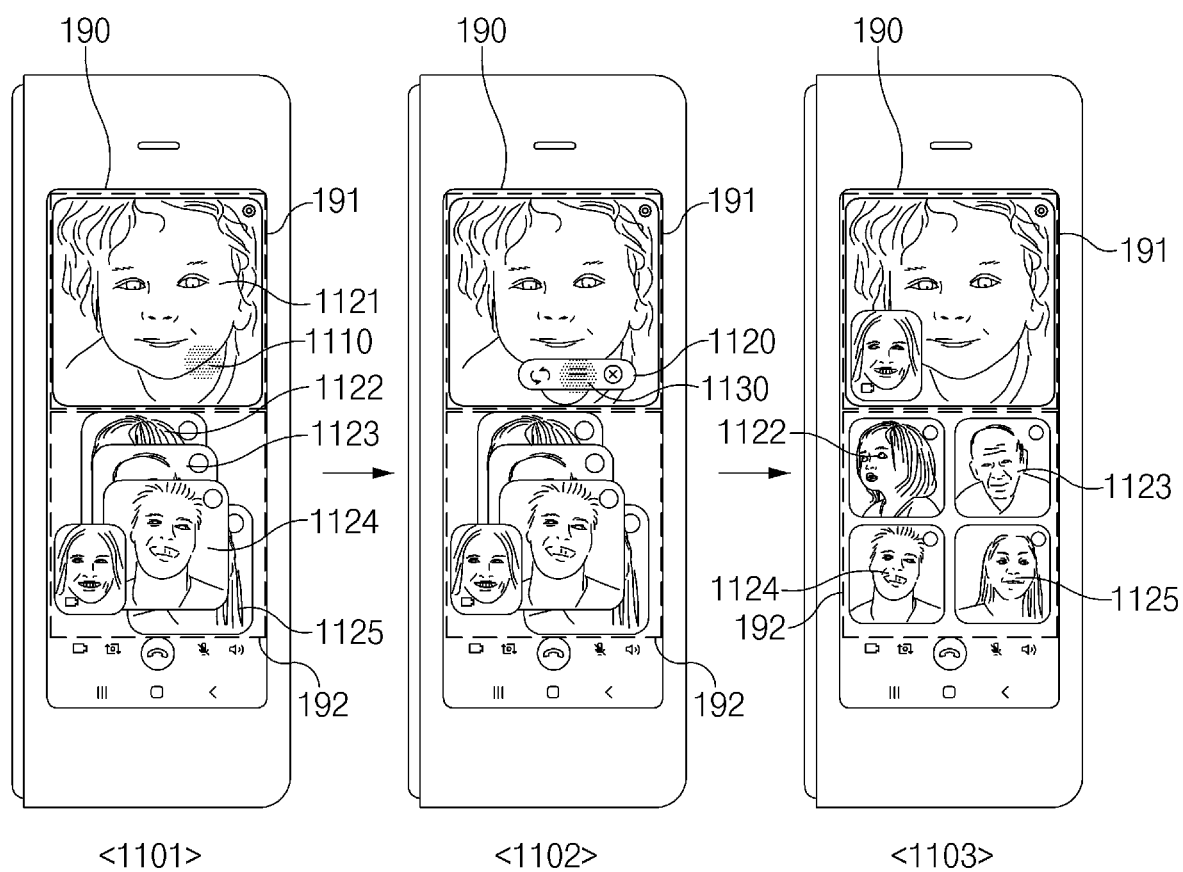
FIG. 11 is a diagram illustrating a method of displaying a second region in a second display (or a partial region of a first display upon using an out-folding scheme) of an electronic device according to an embodiment.

FIG. 11 is a diagram illustrating a method of displaying a second sub-region in a second display (or a partial region of the first display 100 upon using an out-folding scheme) of an electronic device according to an embodiment.

Referring to FIG. 11, in a folded state, the processor of the electronic device 10 may display a thumbnail 1121 of a selected call target in the first sub-region 191. In the folded state, the processor may display thumbnails 1122, 1123, 1124, and 1125 of unselected call targets in the second sub-region 192. The thumbnails 1122, 1123, 1124, and 1125 of the unselected call targets may have a hierarchical arrangement and may be displayed such that portions of the thumbnails overlap with one another.

According to an embodiment, in state 1101, the processor may receive a user input 1110 (e.g., touch and hold) in the first sub-region 191. In state 1102, the processor may display a menu object 1120 in the first sub-region 191 in response to the user input 1110. The processor may receive a user input 1130 (e.g., touch) to a portion of the menu object 1120. In state 1103, the processor may change the placement method of thumbnails 1122, 1123, 1124, and 1125 of the unselected call targets in the second sub-region 192 in response to the user input 1130. For example, the processor may arrange thumbnails 1122, 1123, 1124, and 1125 of unselected call targets in a list format (or checkerboard format).

Figure 12:
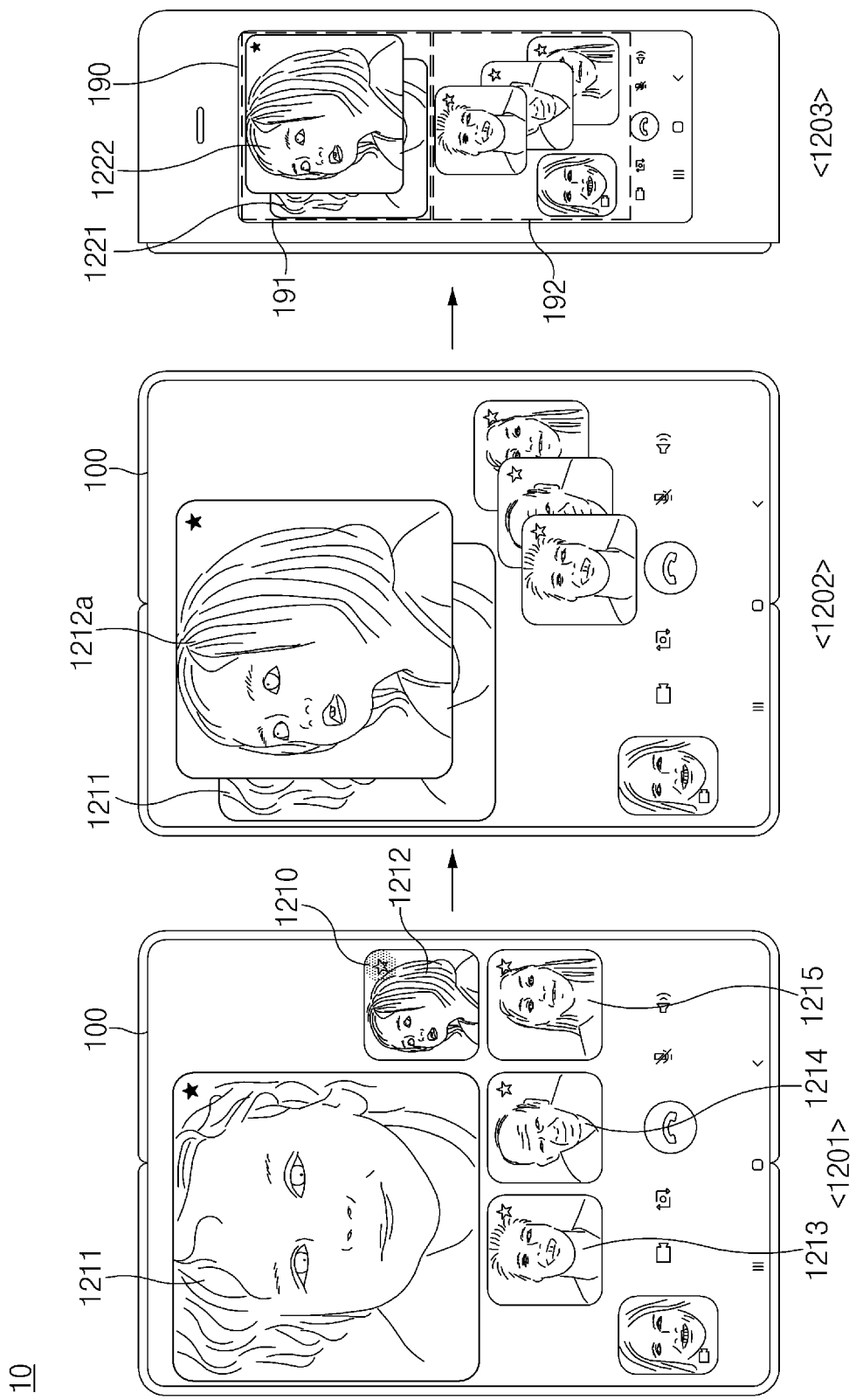
FIG. 12 is a diagram illustrating a method of displaying a selected call target on a first display or a second display (or a partial region of a first display upon using an out-folding scheme) of an electronic device according to an embodiment.

FIG. 12 is a diagram illustrating a method of displaying a selected call target on a first display or a second display (or a partial region of the first display 100 upon using an out-folding scheme) of an electronic device according to an embodiment.

Referring to FIG. 12, in state 1201 (e.g., an unfolded state), a processor of the electronic device 10 may display a thumbnail 1211 of a selected call target and thumbnails 1212, 1213, 1214, and 1215 of unselected call targets on the first display 100.

According to an embodiment, in state 1201, the processor may receive a user input 1210 (e.g., touch) to a specific point of the single thumbnail 1212 among unselected call targets. In state 1202 (e.g., an unfolded state), the processor may change the thumbnail 1212 of the unselected call target to a thumbnail 1212a of the selected call target in response to the user input 1210. In certain embodiments, the thumbnail 1211 of the previous selected call target and the thumbnail 1212a of the new selected call target may disposed in a hierarchical overlapping arrangement.

According to an embodiment, in state 1203 (e.g., a folded state), the processor may display thumbnails 1221 and 1222 of selected call targets in the first sub-region 191 on the second display 190 (or a partial region of the first display 100 upon using an out-folding scheme). For example, in the first sub-region 191, the thumbnails 1221 and 1222 of selected call targets may be disposed in a hierarchical arrangement, and may be displayed such that portions of the thumbnails overlap with one another.

Figure 13:
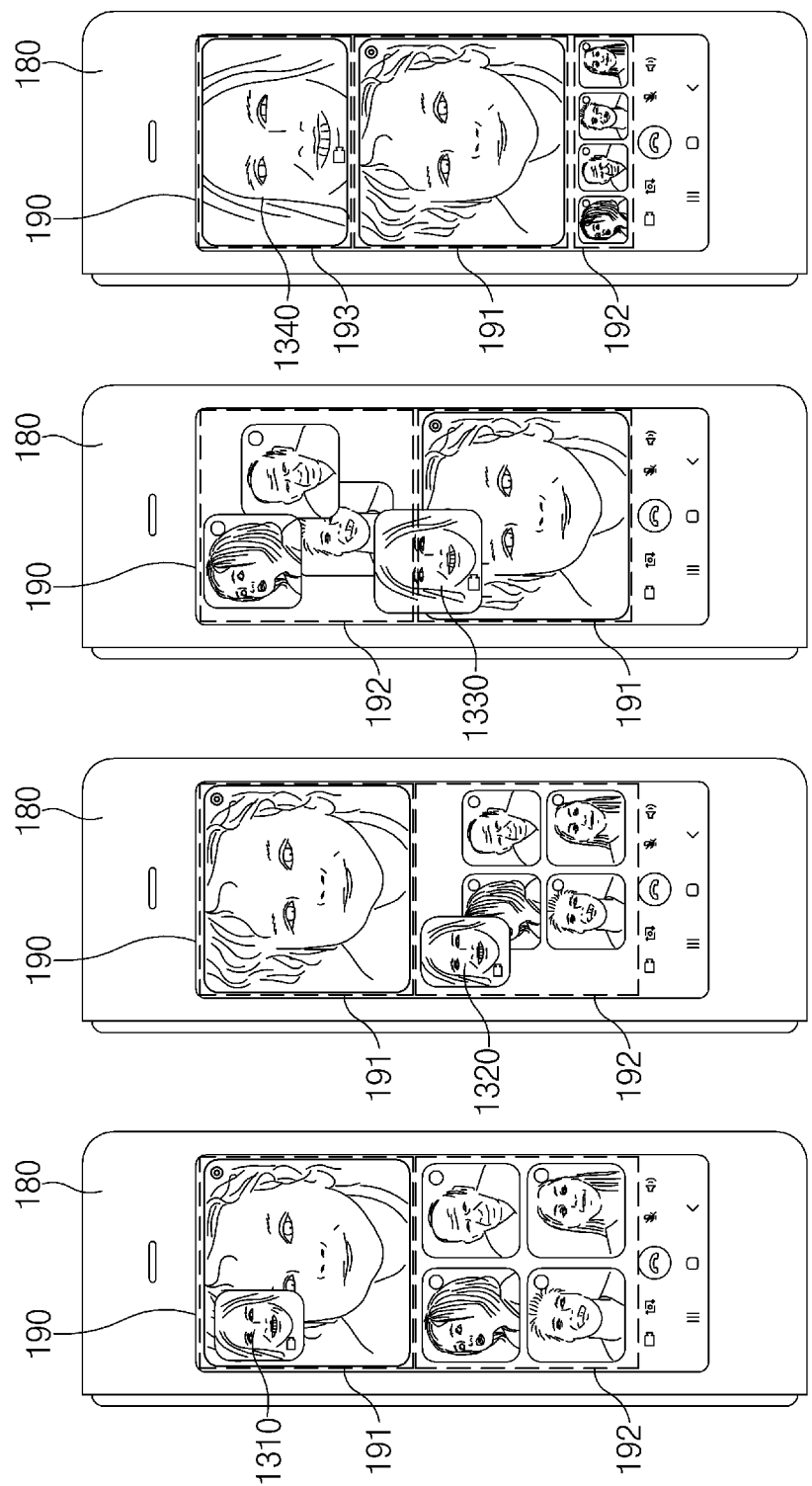
FIG. 13 is a diagram illustrating a method of displaying a thumbnail of an image captured by a camera on a second display (or a partial region of a first display upon using an out-folding scheme) of an electronic device according to an embodiment.

FIG. 13 is a diagram illustrating a method of displaying a thumbnail of an image captured by a camera on a second display (or a partial region of the first display 100 upon using an out-folding scheme) of an electronic device according to an embodiment.

Referring to FIG. 13, when the electronic device 10 is switched to a folded state, the processor of the electronic device 10 may activate the second display 190 and a second camera 180 (or activating a partial region of the first display 100 and a first camera (e.g., a camera capturing an image in the same direction as a direction of a partial region of the first display 100) upon using an out-folding scheme). The processor may display a thumbnail 1310, 1320, 1330 or 1340 of an image captured by the second camera 180 (or the first camera upon using an out-folding scheme) on the second display 190.

According to an embodiment, in state 1301, the processor may display the thumbnail 1310 of the image captured by the second camera 180 (or the first camera upon using an out-folding scheme) in the first sub-region 191 of the second display 190 (or a partial region of the first display 100 upon using an out-folding scheme). According to an embodiment, in state 1302, the processor may display the thumbnail 1320 of the image captured by the second camera 180 (or the first camera upon using an out-folding scheme) in the second sub-region 192. According to an embodiment, in state 1303, the processor may display the thumbnail 1330 of the image captured by the second camera 180 (or the first camera upon using an out-folding scheme) at the boundary between the first sub-region 191 and the second sub-region 192. According to certain embodiments, in state 1304, the processor may set a third region 193 different from the first sub-region 191 or the second sub-region 192, on the second display 190 (or a partial region of the first display 100 upon using an out-folding scheme). The processor may display the thumbnail 1340 of an image captured by the second camera 180 (or the first camera upon using an out-folding scheme) on the third region 193.

Figure 14:
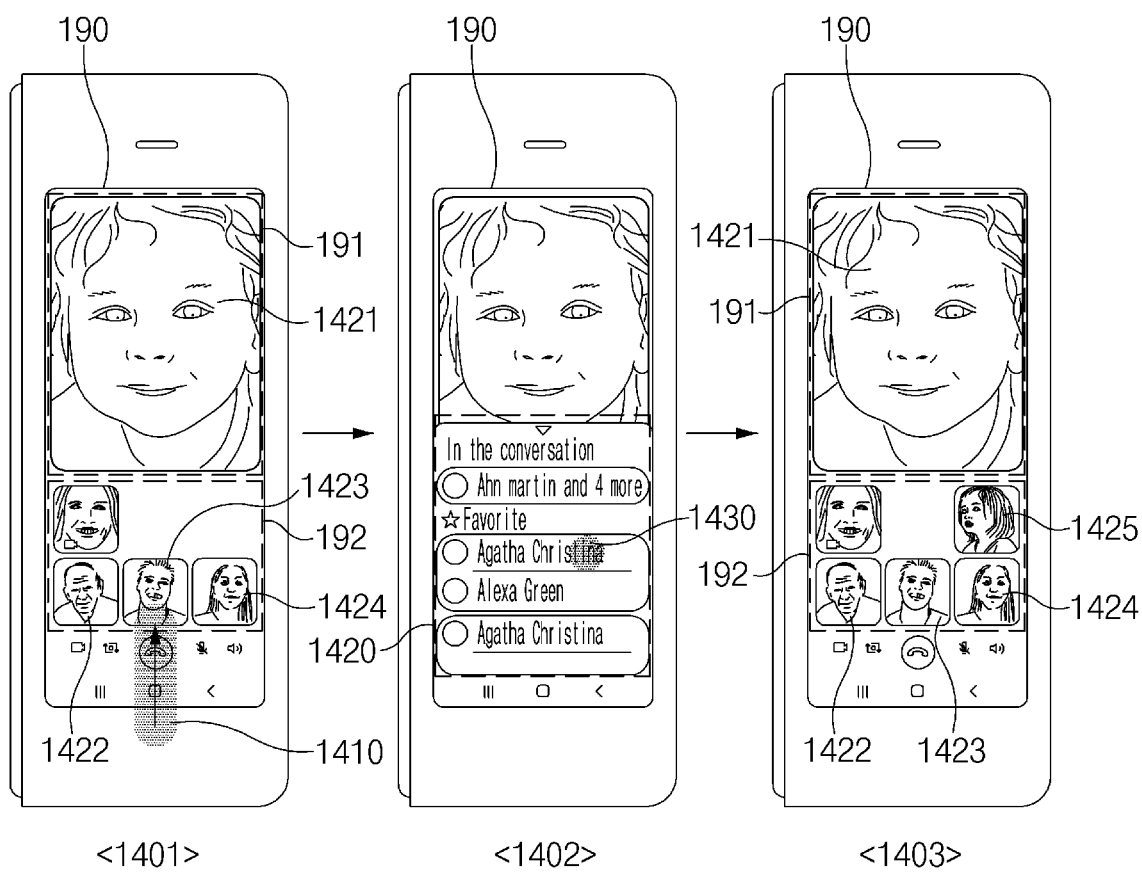
FIG. 14 is a diagram illustrating a method of adding a call target on a second display (or a partial region of a first display upon using an out-folding scheme) of an electronic device according to an embodiment.

FIG. 14 is a diagram illustrating a method of adding a call target on a second display (or a partial region of the first display 100 upon using an out-folding scheme) of an electronic device according to an embodiment.

Referring to FIG. 14, in a folded state, the processor of the electronic device 10 may display a thumbnail 1421 of a selected call target in the first sub-region 191 of the second display 190 (or a partial region of the first display 100 upon using an out-folding scheme). In the folded state, the processor may display thumbnails 1422, 1423, and 1424 of unselected call targets in the second sub-region 192. The thumbnails 1422, 1423, and 1424 of the unselected call targets may be displayed in a list format (or a checkerboard format). Alternatively, the thumbnails 1422, 1423, and 1424 of the unselected call targets may have a hierarchical arrangement and may be displayed such that portions of the thumbnails overlap with one another.

According to an embodiment, in state 1401, the processor may receive a user input 1410 (e.g., an edge swipe) to the second display 190 (or a partial region of the first display 100 upon using an out-folding scheme). For example, the user input 1410 may be initiated from one of the corners of the second display 190 (or a partial region of the first display 100 upon using an out-folding scheme). In state 1402, the processor may display a previously-stored address book 1420 in response to the user input 1410. The processor may receive a user input 1430 (e.g., touching the list of address book) to the address book 1420. In certain embodiments, the address book 1420 may be displayed as a list and the user input 1430 may be received to one of the entries within the list. In state 1403, the processor may add a thumbnail 1425 of an unselected call target to the second sub-region 192 based on a call target corresponding to the user input 1430. In certain embodiments, the processor may display the thumbnail 1425 of the added unselected call target at the highest level or may apply visual affordance (e.g., highlighting the border of the thumbnail) to the thumbnail 1425 of the added unselected call target.

Figure 15:
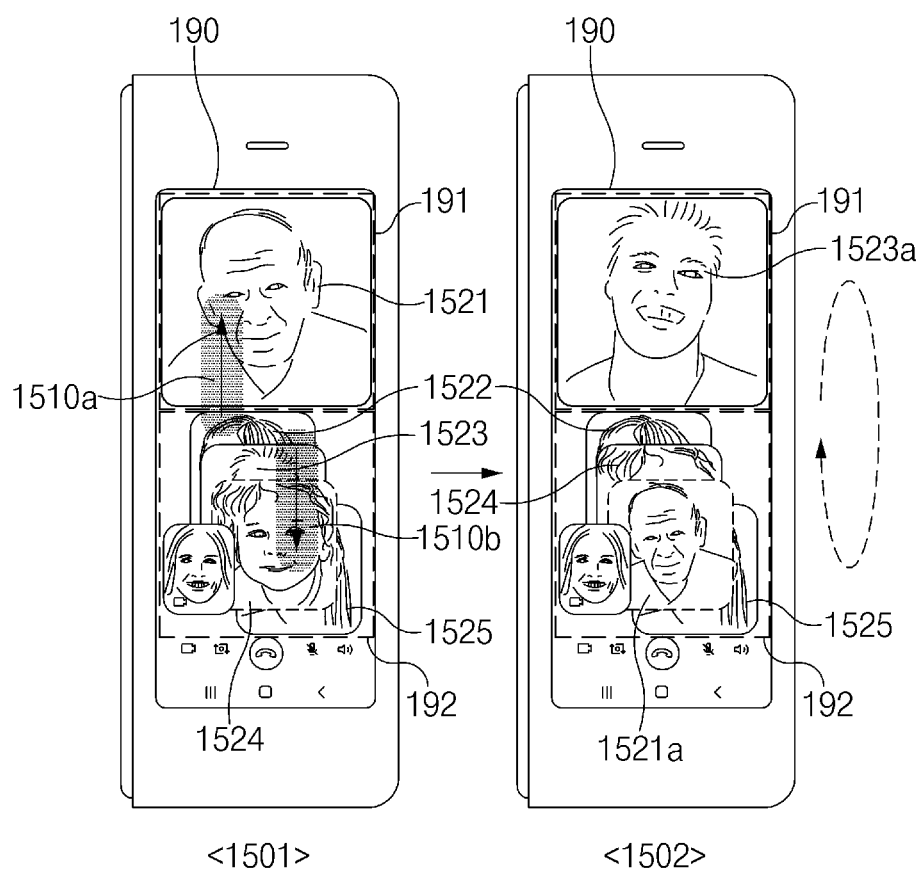
FIG. 15 is a diagram illustrating a method of manipulating a thumbnail on a second display (or a partial region of a first display upon using an out-folding scheme) of an electronic device according to an embodiment.
Figure 16:
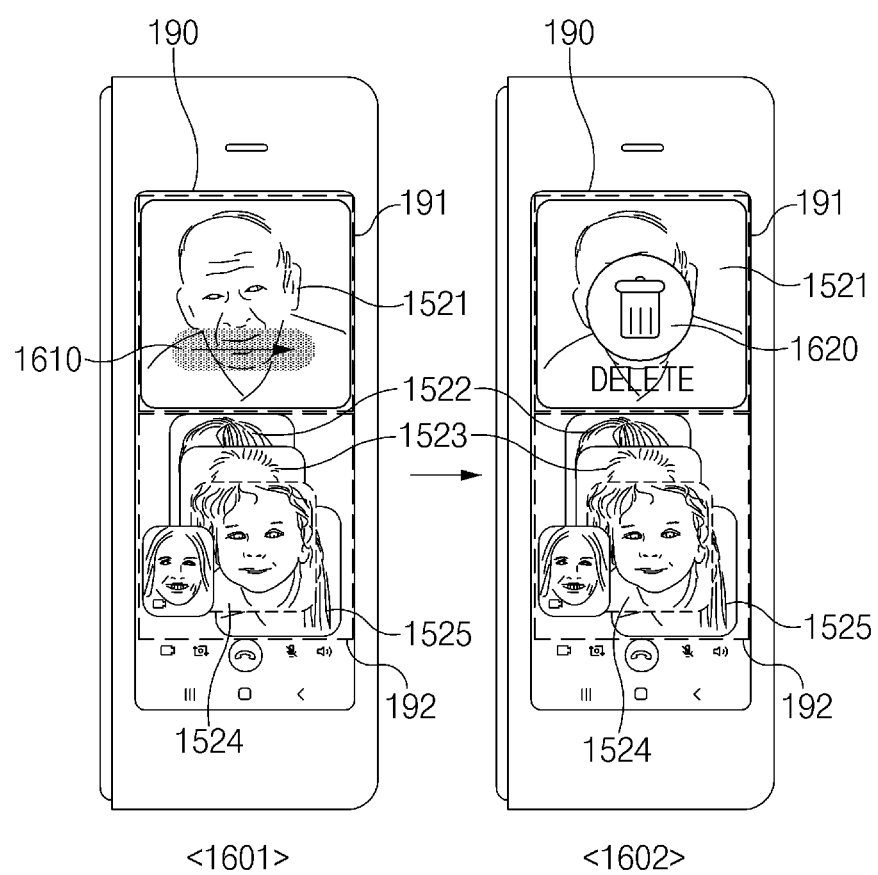
FIG. 16 is a diagram illustrating a method of manipulating a thumbnail on a second display (or a partial region of a first display upon using an out-folding scheme) of an electronic device according to certain embodiments.
Figure 17:
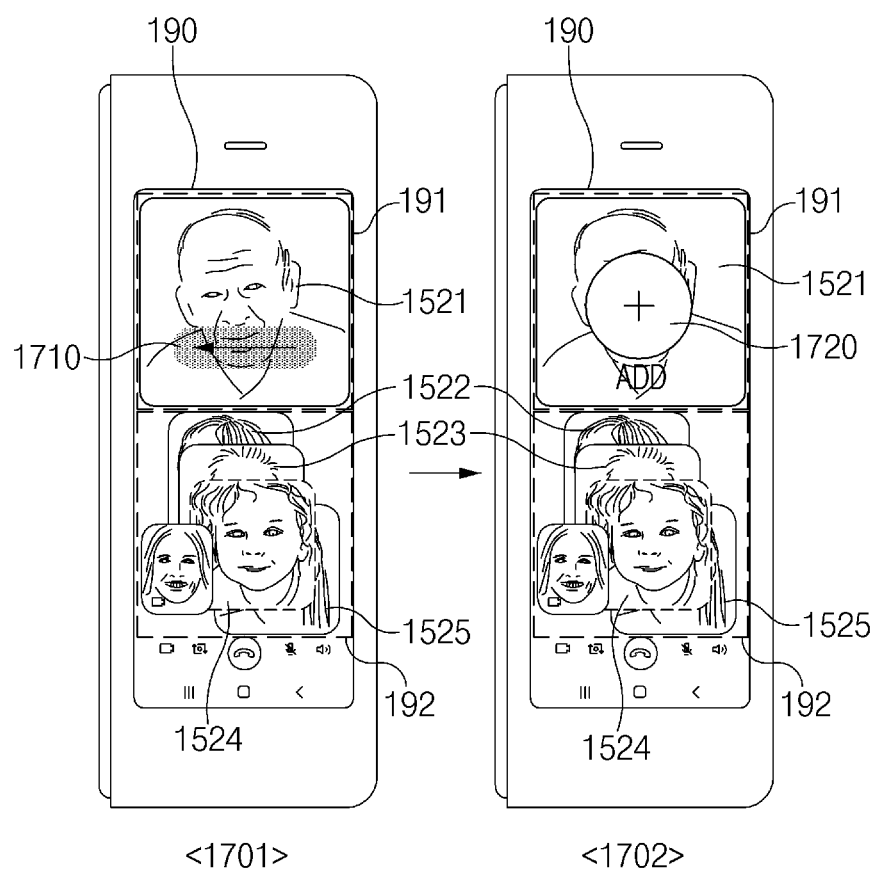
FIG. 17 is a diagram illustrating a method of manipulating a thumbnail on a second display (or a partial region of a first display upon using an out-folding scheme) of an electronic device according to certain embodiments.
Figure 18:
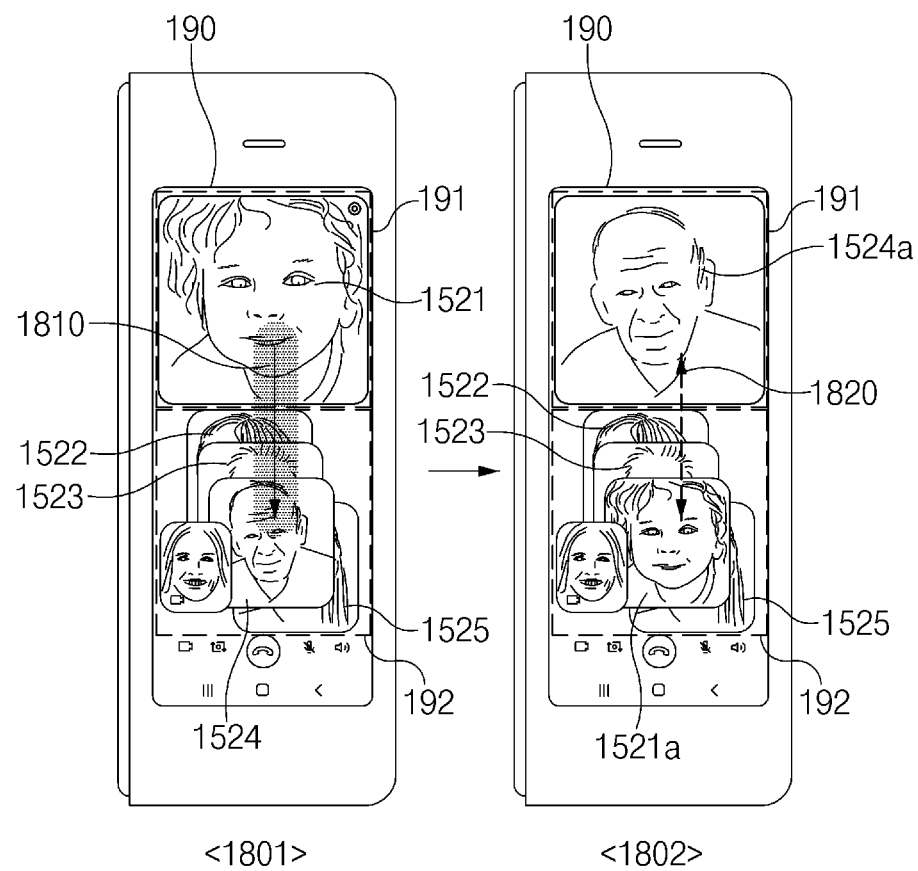
FIG. 18 is a diagram illustrating a method of manipulating a thumbnail on a second display (or a partial region of a first display upon using an out-folding scheme) of an electronic device according to certain embodiments.
Figure 19:
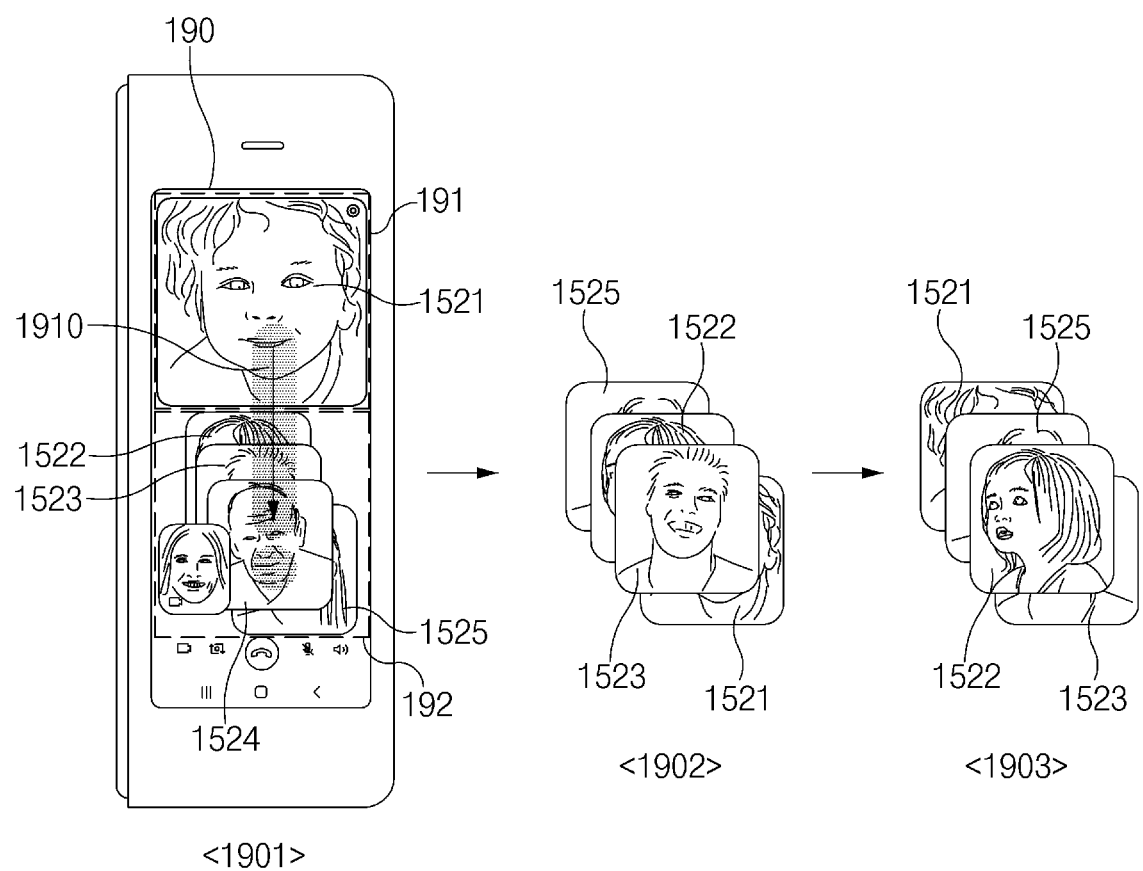
FIG. 19 is a diagram illustrating a method of manipulating a thumbnail on a second display (or a partial region of a first display upon using an out-folding scheme) of an electronic device according to certain embodiments.

FIG. 15 is a diagram illustrating a method of manipulating a thumbnail on a second display (or a partial region of the first display 100 upon using an out-folding scheme) of an electronic device according to an embodiment. FIG. 16 is a diagram illustrating a method of manipulating a thumbnail on a second display (or a partial region of the first display 100 upon using an out-folding scheme) of an electronic device according to certain embodiments. FIG. 17 is a diagram illustrating a method of manipulating a thumbnail on a second display (or a partial region of the first display 100 upon using an out-folding scheme) of an electronic device according to certain embodiments. FIG. 18 is a diagram illustrating a method of manipulating a thumbnail on a second display (or a partial region of the first display 100 upon using an out-folding scheme) of an electronic device according to certain embodiments. FIG. 19 is a diagram illustrating a method of manipulating a thumbnail on a second display (or a partial region of the first display 100 upon using an out-folding scheme) of an electronic device according to certain embodiments.

Referring to FIGS. 15 to 19, in a folded state, the processor of the electronic device 10 may display a thumbnail 1521 of a selected call target in the first sub-region 191 of the second display 190 (or a partial region of the first display 100 upon using an out-folding scheme). In the folded state, the processor may display thumbnails 1522, 1523, 1524, and 1525 of unselected call targets in the second sub-region 192. The thumbnails 1522, 1523, 1524, and 1525 of the unselected call targets may have a hierarchical arrangement and may be displayed such that portions of the thumbnails overlap with one another.

According to an embodiment, in state 1501, the processor may receive a user input 1510a (e.g., touch and slide toward the upper portion of the second display 190) or user input 1510b (e.g., touch and slide toward the upper portion of the second display 190) to the second display 190 (or a partial region of the first display 100 upon using an out-folding scheme). In state 1502 of FIG. 15, the processor may change which thumbnail is displayed in the first sub-region 191, by rotating through the thumbnail 1521 of the selected call target and the thumbnails 1522, 1523, 1524, and 1525 of the unselected call targets in a specified order, in response to the user input 1510a or the user input 1510b. For example, depending on the user input 1510a or the user input 1510b, the processor may change the thumbnail 1523 of the unselected call target to a thumbnail 1523a of the selected call target and may change the thumbnail 1521 of the selected call target to a thumbnail 1521a of the unselected call target.

According to an embodiment, in state 1601 of FIG. 16, the processor may receive a user input 1610 (e.g., touch and slide toward the right side of the second display 190 or a partial region of the first display 100 upon using an out-folding scheme) to the thumbnail 1521 of the selected call target. In state 1602 of FIG. 16, the processor may display a "DELETE" object 1620 on the thumbnail 1521 of the selected call target in response to the user input 1610. When receiving a user input (e.g., touch) to the "DELETE" object 1620, the processor may delete the thumbnail 1521 of the selected call target and may block the connection with the selected call target.

According to an embodiment, in state 1701 of FIG. 17, the processor may receive a user input 1710 (e.g., touch and slide toward the left side of the second display 190 or a partial region of the first display 100 upon using an out-folding scheme) to the thumbnail 1521 of the selected call target. In state 1702 of FIG. 17, the processor may display an "ADD" object 1720 on the thumbnail 1521 of the selected call target in response to the user input 1710. When receiving a user input (e.g., touch) to the "ADD" object 1720, the processor may add a new selected call target to the first sub-region 191 based on selection of one of the unselected call targets displayed in the second sub-region 191.

According to an embodiment, in state 1801 of FIG. 18, the processor may receive a user input 1810 (e.g., drag and drop) to the thumbnail 1521 of the selected call target. In state 1802 of FIG. 18, the processor may exchange (1820) the selected call target and the unselected call target in response to the user input 1810. For example, depending on the user input 1810, the processor may change (e.g., swap) the thumbnail 1521 of the selected call target to the thumbnail 1521a of the unselected call target and may change the thumbnail 1524 of the unselected call target to a thumbnail 1524a of the selected call target.

According to an embodiment, in state 1901 of FIG. 19, the processor may receive a user input 1910 (e.g., drag and drop and hold) over the first sub-region 191 and the second sub-region 192 of the second display 190 (or a partial region of the first display 100 upon using an out-folding scheme). In state 1902 and state 1903, while a part (e.g., hold) of the user input 1910 is maintained, the processor may rotate the thumbnail 1521 of the selected call target and the thumbnails 1522, 1523, 1524, and 1525 of the unselected call targets, in a specified order. When the user input 1910 is stopped, the processor may set the unselected call target positioned at the highest level, as the selected call target.

Figure 20:
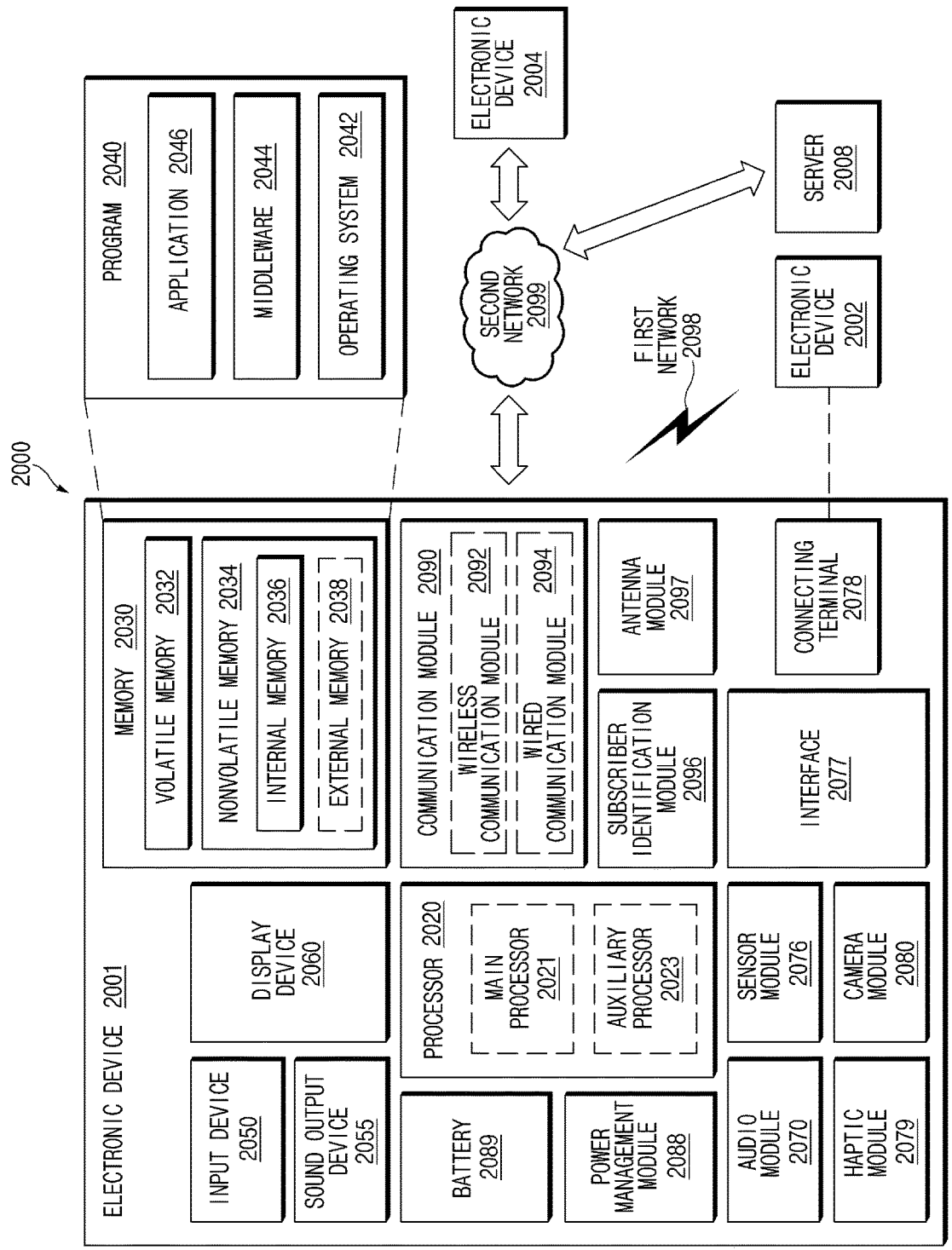
FIG. 20 is a block diagram illustrating an electronic device in a network environment according to certain embodiments.

FIG. 20 is a block diagram illustrating an electronic device 2001 in a network environment 2000 according to certain embodiments. Referring to FIG. 20, the electronic device 2001 in the network environment 2000 may communicate with an electronic device 2002 via a first network 2098 (e.g., a short-range wireless communication network), or an electronic device 2004 or a server 2008 via a second network 2099 (e.g., a long-range wireless communication network). According to an embodiment, the electronic device 2001 may communicate with the electronic device 2004 via the server 2008. According to an embodiment, the electronic device 2001 may include a processor 2020, memory 2030, an input device 2050, a sound output device 2055, a display device 2060, an audio module 2070, a sensor module 2076, an interface 2077, a haptic module 2079, a camera module 2080, a power management module 2088, a battery 2089, a communication module 2090, a subscriber identification module (SIM) 2096, or an antenna module 2097. In some embodiments, at least one (e.g., the display device 2060 or the camera module 2080) of the components may be omitted from the electronic device 2001, or one or more other components may be added in the electronic device 2001. In some embodiments, some of the components may be implemented as single integrated circuitry. For example, the sensor module 2076 (e.g., a fingerprint sensor, an iris sensor, or an illuminance sensor) may be implemented as embedded in the display device 2060 (e.g., a display).

The processor 2020 may execute, for example, software (e.g., a program 2040) to control at least one other component (e.g., a hardware or software component) of the electronic device 2001 coupled with the processor 2020, and may perform various data processing or computation. According to an embodiment, as at least part of the data processing or computation, the processor 2020 may load a command or data received from another component (e.g., the sensor module 2076 or the communication module 2090) in volatile memory 2032, process the command or the data stored in the volatile memory 2032, and store resulting data in non-volatile memory 2034. According to an embodiment, the processor 2020 may include a main processor 2021 (e.g., a central processing unit (CPU) or an application processor (AP)), and an auxiliary processor 2023 (e.g., a graphics processing unit (GPU), an image signal processor (ISP), a sensor hub processor, or a communication processor (CP)) that is operable independently from, or in conjunction with, the main processor 2021. Additionally or alternatively, the auxiliary processor 2023 may be adapted to consume less power than the main processor 2021, or to be specific to a specified function. The auxiliary processor 2023 may be implemented as separate from, or as part of the main processor 2021.

The auxiliary processor 2023 may control at least some of functions or states related to at least one component (e.g., the display device 2060, the sensor module 2076, or the communication module 2090) among the components of the electronic device 2001, instead of the main processor 2021 while the main processor 2021 is in an inactive (e.g., sleep) state, or together with the main processor 2021 while the main processor 2021 is in an active state (e.g., executing an application). According to an embodiment, the auxiliary processor 2023 (e.g., an image signal processor or a communication processor) may be implemented as part of another component (e.g., the camera module 2080 or the communication module 2090) functionally related to the auxiliary processor 2023.

The memory 2030 may store various data used by at least one component (e.g., the processor 2020 or the sensor module 2076) of the electronic device 2001. The various data may include, for example, software (e.g., the program 2040) and input data or output data for a command related thereto. The memory 2030 may include the volatile memory 2032 or the non-volatile memory 2034.

The program 2040 may be stored in the memory 2030 as software, and may include, for example, an operating system (OS) 2042, middleware 2044, or an application 2046.

The input device 2050 may receive a command or data to be used by other component (e.g., the processor 2020) of the electronic device 2001, from the outside (e.g., a user) of the electronic device 2001. The input device 2050 may include, for example, a microphone, a mouse, a keyboard, or a digital pen (e.g., a stylus pen).

The sound output device 2055 may output sound signals to the outside of the electronic device 2001. The sound output device 2055 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 2060 may visually provide information to the outside (e.g., a user) of the electronic device 2001. The display device 2060 may include, for example, a display, a hologram device, or a projector and control circuitry to control a corresponding one of the display, hologram device, and projector. According to an embodiment, the display device 2060 may include touch circuitry adapted to detect a touch, or sensor circuitry (e.g., a pressure sensor) adapted to measure the intensity of force incurred by the touch.

The audio module 2070 may convert a sound into an electrical signal and vice versa. According to an embodiment, the audio module 2070 may obtain the sound via the input device 2050, or output the sound via the sound output device 2055 or a headphone of an external electronic device (e.g., an electronic device 2002) directly (e.g., wiredly) or wirelessly coupled with the electronic device 2001.

The sensor module 2076 may detect an operational state (e.g., power or temperature) of the electronic device 2001 or an environmental state (e.g., a state of a user) external to the electronic device 2001, and then generate an electrical signal or data value corresponding to the detected state. According to an embodiment, the sensor module 2076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2077 may support one or more specified protocols to be used for the electronic device 2001 to be coupled with the external electronic device (e.g., the electronic device 2002) directly (e.g., wiredly) or wirelessly. According to an embodiment, the interface 2077 may include, for example, a high definition multimedia interface (HDMI), a universal serial bus (USB) interface, a secure digital (SD) card interface, or an audio interface.

A connecting terminal 2078 may include a connector via which the electronic device 2001 may be physically connected with the external electronic device (e.g., the electronic device 2002). According to an embodiment, the connecting terminal 2078 may include, for example, a HDMI connector, a USB connector, a SD card connector, or an audio connector (e.g., a headphone connector).

The haptic module 2079 may convert an electrical signal into a mechanical stimulus (e.g., a vibration or a movement) or electrical stimulus which may be recognized by a user via his tactile sensation or kinesthetic sensation. According to an embodiment, the haptic module 2079 may include, for example, a motor, a piezoelectric element, or an electric stimulator.

The camera module 2080 may capture a still image or moving images. According to an embodiment, the camera module 2080 may include one or more lenses, image sensors, image signal processors, or flashes.

The power management module 2088 may manage power supplied to the electronic device 2001. According to an embodiment, the power management module 2088 may be implemented as at least part of, for example, a power management integrated circuit (PMIC).

The battery 2089 may supply power to at least one component of the electronic device 2001. According to an embodiment, the battery 2089 may include, for example, a primary cell which is not rechargeable, a secondary cell which is rechargeable, or a fuel cell.

The communication module 2090 may support establishing a direct (e.g., wired) communication channel or a wireless communication channel between the electronic device 2001 and the external electronic device (e.g., the electronic device 2002, the electronic device 2004, or the server 2008) and performing communication via the established communication channel. The communication module 2090 may include one or more communication processors that are operable independently from the processor 2020 (e.g., the application processor (AP)) and supports a direct (e.g., wired) communication or a wireless communication. According to an embodiment, the communication module 2090 may include a wireless communication module 2092 (e.g., a cellular communication module, a short-range wireless communication module, or a global navigation satellite system (GNSS) communication module) or a wired communication module 2094 (e.g., a local area network (LAN) communication module or a power line communication (PLC) module). A corresponding one of these communication modules may communicate with the external electronic device via the first network 2098 (e.g., a short-range communication network, such as Bluetooth™, wireless-fidelity (Wi-Fi) direct, or infrared data association (IrDA)) or the second network 2099 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2092 may identify and authenticate the electronic device 2001 in a communication network, such as the first network 2098 or the second network 2099, using subscriber information (e.g., international mobile subscriber identity (IMSI)) stored in the subscriber identification module 2096.

The antenna module 2097 may transmit or receive a signal or power to or from the outside (e.g., the external electronic device) of the electronic device 2001. According to an embodiment, the antenna module 2097 may include an antenna including a radiating element implemented using a conductive material or a conductive pattern formed in or on a substrate (e.g., PCB). According to an embodiment, the antenna module 2097 may include a plurality of antennas. In such a case, at least one antenna appropriate for a communication scheme used in the communication network, such as the first network 2098 or the second network 2099, may be selected, for example, by the communication module 2090 (e.g., the wireless communication module 2092) from the plurality of antennas. The signal or the power may then be transmitted or received between the communication module 2090 and the external electronic device via the selected at least one antenna. According to an embodiment, another component (e.g., a radio frequency integrated circuit (RFIC)) other than the radiating element may be additionally formed as part of the antenna module 2097.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2001 and the external electronic device 2004 via the server 2008 coupled with the second network 2099. Each of the electronic devices 2002 and 2004 may be a device of a same type as, or a different type, from the electronic device 2001. According to an embodiment, all or some of operations to be executed at the electronic device 2001 may be executed at one or more of the external electronic devices 2002, 2004, or 2008. For example, if the electronic device 2001 should perform a function or a service automatically, or in response to a request from a user or another device, the electronic device 2001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2001. The electronic device 2001 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 2040) including one or more instructions that are stored in a storage medium (e.g., internal memory 2036 or external memory 2038) that is readable by a machine (e.g., the electronic device 2001). For example, a processor (e.g., the processor 2020) of the machine (e.g., the electronic device 2001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

According to certain embodiments disclosed in this specification, it is possible to effectively display call targets based on the changed display size when the size of the display is changed during a multilateral video call.

Besides, a variety of effects directly or indirectly understood through the disclosure may be provided.

While the disclosure has been shown and described with reference to certain embodiments thereof, it will be understood by those skilled in the art that various changes in form and details may be made therein without departing from the disclosure as defined by the appended claims and their equivalents.

What is claimed is:

1. An electronic device, comprising:
a housing foldable along at least one axis;
a first display disposed on a first surface of the housing, the first display flexible as to switch from an unfolded state to a folded state along the at least one axis;
a second display disposed on a second surface of the housing opposite to the first surface; and
a processor operatively connected to the first display and the second display,
wherein the processor is configured to:
execute a video call including display of a plurality of call targets on the first display; and
based on detecting a switch from the unfolded state to the folded state while a number of the plurality of call targets is greater than or equal to a reference value:
display a thumbnail of at least one selected call target from among the plurality of call targets in a first sub-region on the second display, and
display thumbnails of unselected call targets from among the plurality of call targets in a second sub-region different from the first sub-region on the second display.

2. The electronic device of claim 1, wherein before detecting the switch, the plurality of call targets are displayed as thumbnails in a first visual arrangement on the first display, wherein the processor is further configured to:
when the number of the plurality of call targets is less than the reference value, display thumbnails of the plurality of call targets on the second display in a second visual arrangement that matches the first visual arrangement.

3. The electronic device of claim 1, wherein the first sub-region is greater in size than each of the thumbnails of the unselected call targets.

4. The electronic device of claim 1, wherein the selected call target is identified based on a user input or a predetermined priority among the plurality of call targets.

5. The electronic device of claim 1, the selected call target is identified based on priority set in a pre-stored address book.

6. The electronic device of claim 5, wherein the selected call target is identified based on a specified category set in the address book.

7. The electronic device of claim 5, wherein the most recently-used contact in the address book is identified as the selected call target.

8. The electronic device of claim 1, wherein the thumbnails of the unselected call targets are displayed hierarchally in an overlapping arrangement in the second sub-region according to respective priorities of each of the unselected call targets.

9. The electronic device of claim 8, wherein the processor is configured to:
detect a user input designating one of the unselected call targets; and
display a thumbnail corresponding to the designated one of the unselected call targets on a top of the overlapping arrangement.

10. The electronic device of claim 8, wherein the processor is configured to:
based on detecting a selection of a thumbnail disposed at a top of the overlapping arrangement, enlarge the selected thumbnail to be larger than other thumbnails of the unselected call targets in the overlapping arrangement.

11. The electronic device of claim 8, wherein a thumbnail corresponding to a call target receiving a voice.

12. The electronic device of claim 1, wherein the processor is configured to:
display a menu object based on detecting a user input to the first sub-region.

13. The electronic device of claim 12, wherein the processor is configured to:
change locations of the first sub-region and the second sub-region on the second display based on detecting a selection of the menu object.

14. The electronic device of claim 12, wherein the processor is configured to:
based on detecting a selection of the menu object, displaying the thumbnails of the unselected call targets hierarchally in an overlapping arrangement in the second sub-region according to respective priorities of each of the unselected call targets.

15. The electronic device of claim 1, further comprising:
a first camera disposed on the first surface and activated in the unfolded state during the video call; and
a second camera disposed on the second surface and activated in the folded state during the video call,
wherein the processor is configured to:
when in the unfolded state, display a thumbnail of a first image captured by the first camera on the first display; and
when in the folded state, display a thumbnail of a second image captured by the second camera on the second display.

16. The electronic device of claim 15, wherein the processor is configured to:
in the folded state, display the thumbnail of the second image in one of the first sub-region or the second sub-region.

17. The electronic device of claim 15, wherein the processor is configured to:
in the folded state, display the thumbnail of the second image, including a boundary disposed between the first sub-region and the second sub-region.

18. The electronic device of claim 15, wherein the processor is configured to:
in the folded state, display the thumbnail of the second image in a third region different from the first sub-region and the second sub-region on the second display.

19. The electronic device of claim 1, wherein the processor is configured to:
based on receiving a user input to the second display, display a pre-stored address book; and
detecting a selection of a contact from the pre-stored address book, and displaying a thumbnail corresponding to the selected contact to the second sub-region.

20. An electronic device comprising:
a housing foldable along at least one axis;
a first display disposed on a first surface of the housing, the first display flexible as to switch from an unfolded state to a folded state along the at least one axis;
a second display disposed on a second surface of the housing opposite to the first surface; and
a processor operatively connected to the first display and the second display,
wherein the processor is configured to:
execute a video call;
display a first thumbnail representing a current call target participating in the video call, with a first size on the second display;
detect addition of a new call target participating in the video call;
display the first thumbnail representing the current call target in a first sub-region on the second display, wherein the thumbnail of the current call target is reduced in size to be smaller than the first size; and
display a second thumbnail representing the new call target in a second sub-region on the second display, the second sub-region different from the first sub-region.

\* \* \* \* \*